March 31, 1942.  J. R. GANGER  2,277,851
ACCOUNTING MACHINE
Filed Oct. 5, 1936  7 Sheets-Sheet 1

Inventor
Jesse R. Ganger
By
Earl Berst
His Attorney

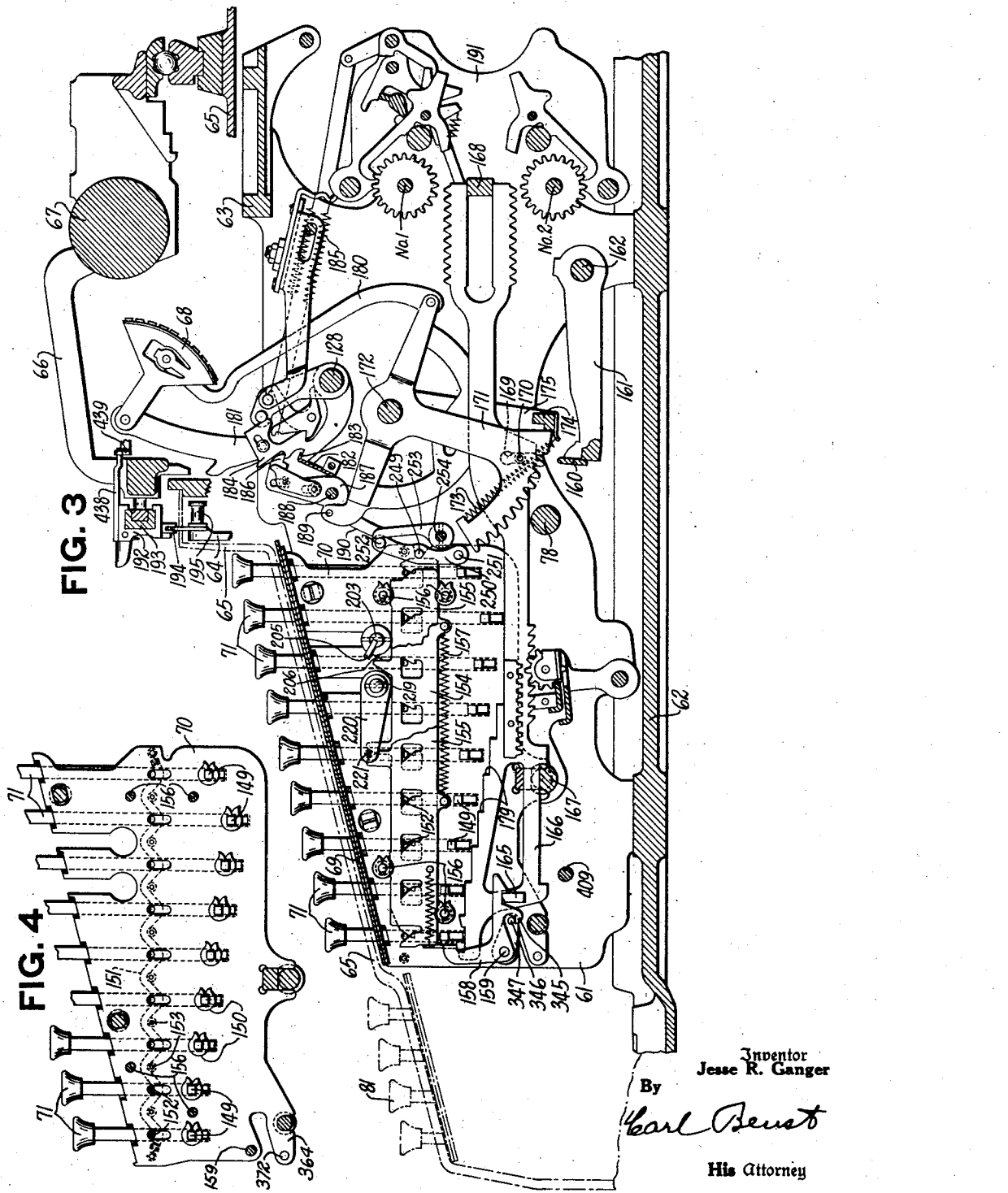

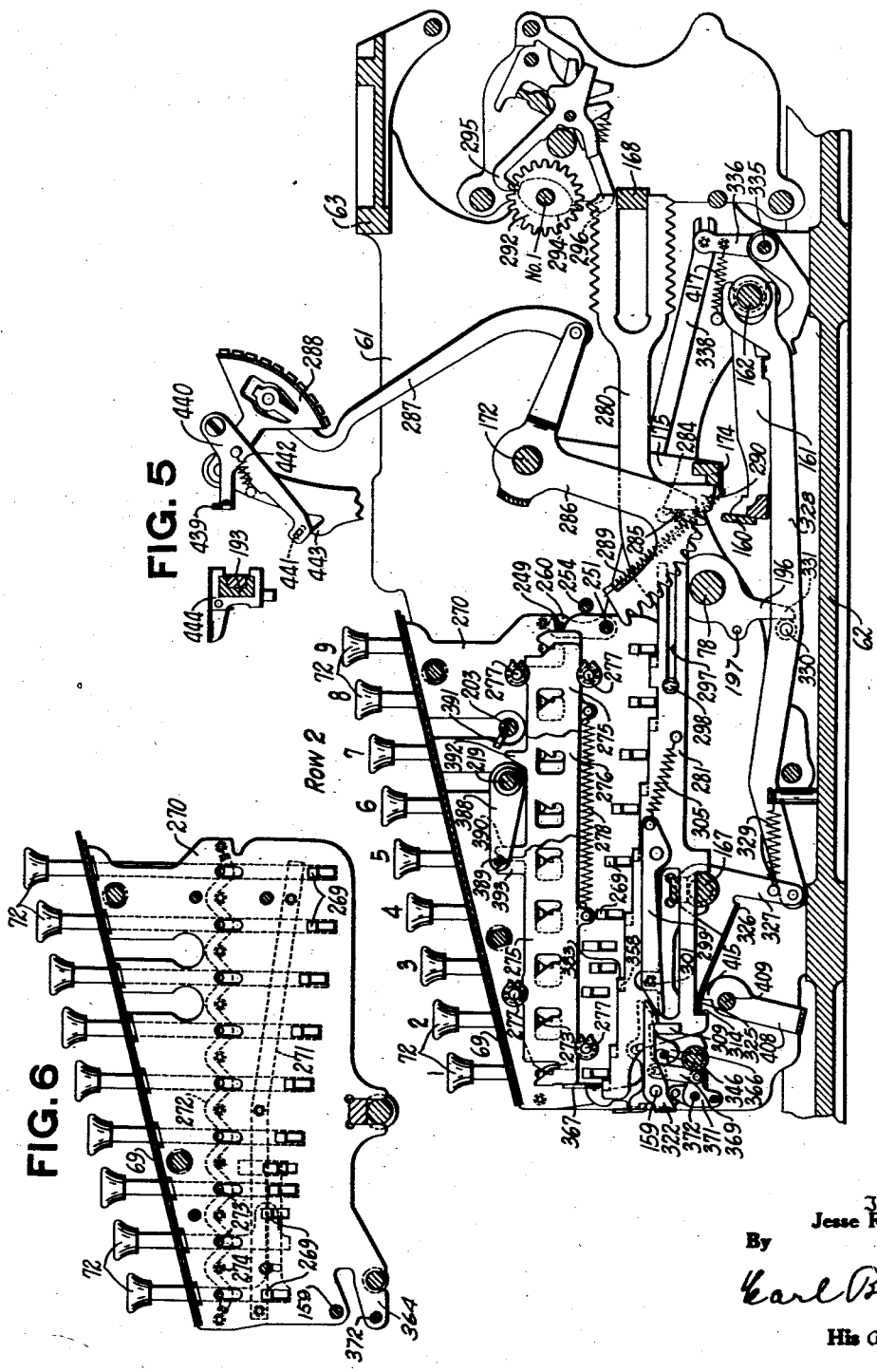

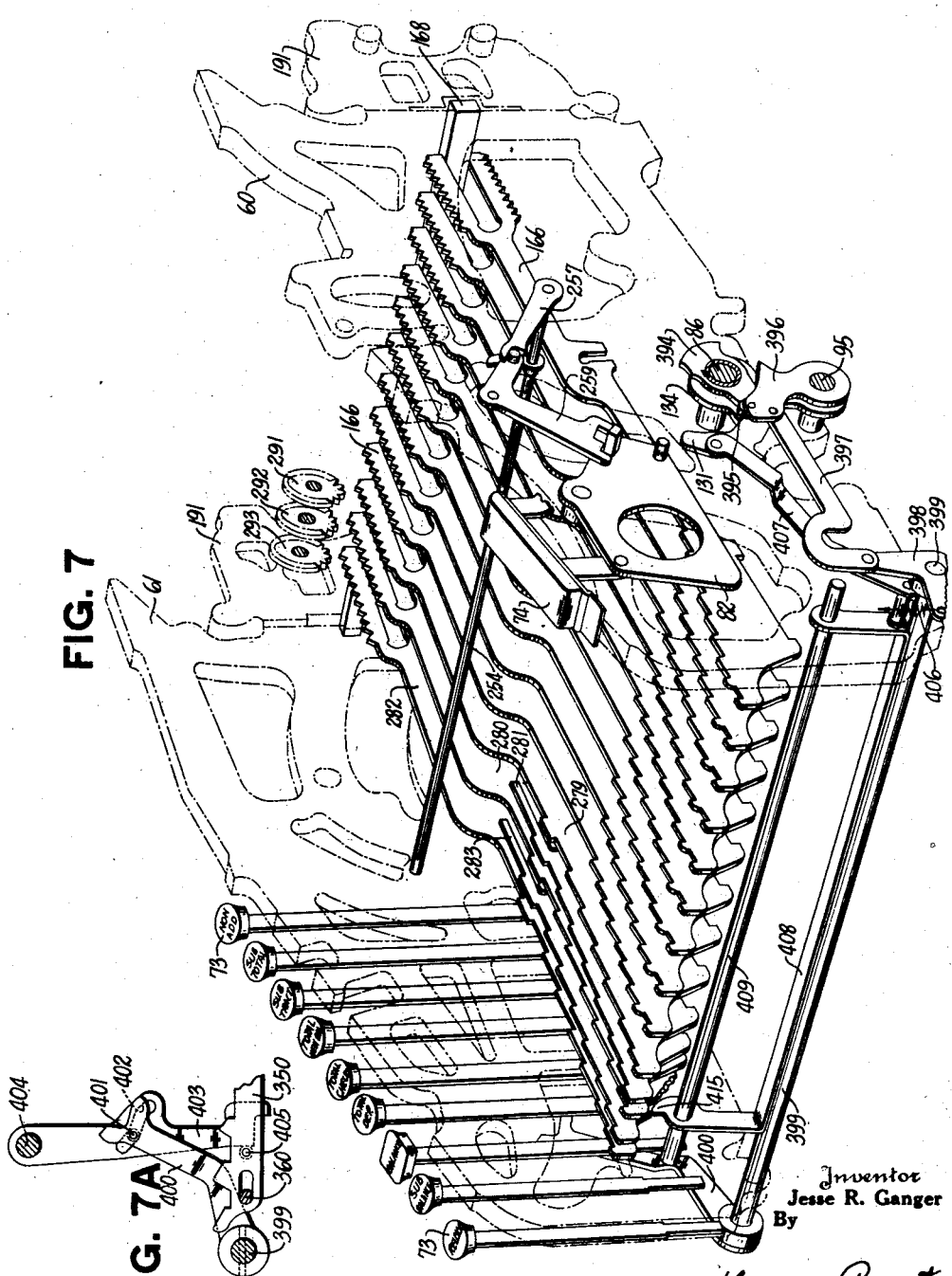

March 31, 1942. J. R. GANGER 2,277,851
ACCOUNTING MACHINE
Filed Oct. 5, 1936 7 Sheets-Sheet 5
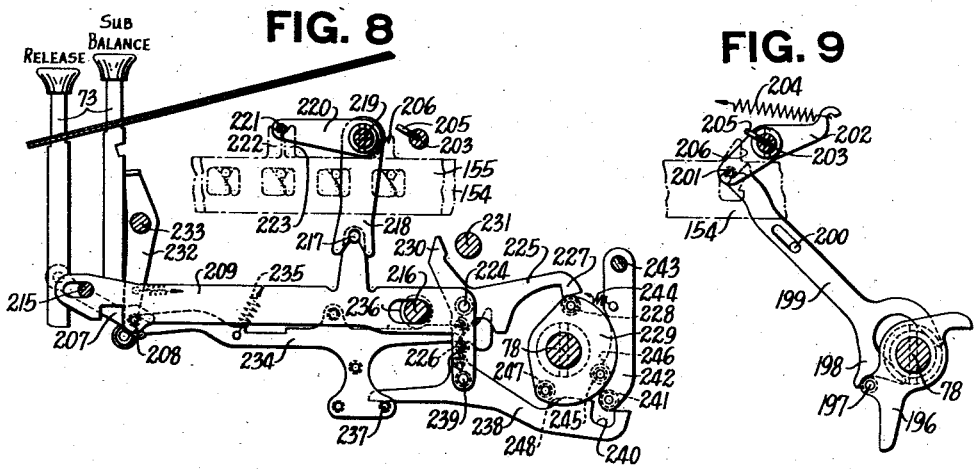
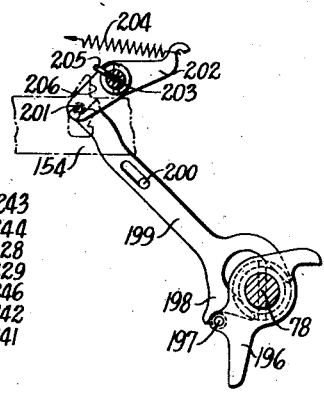
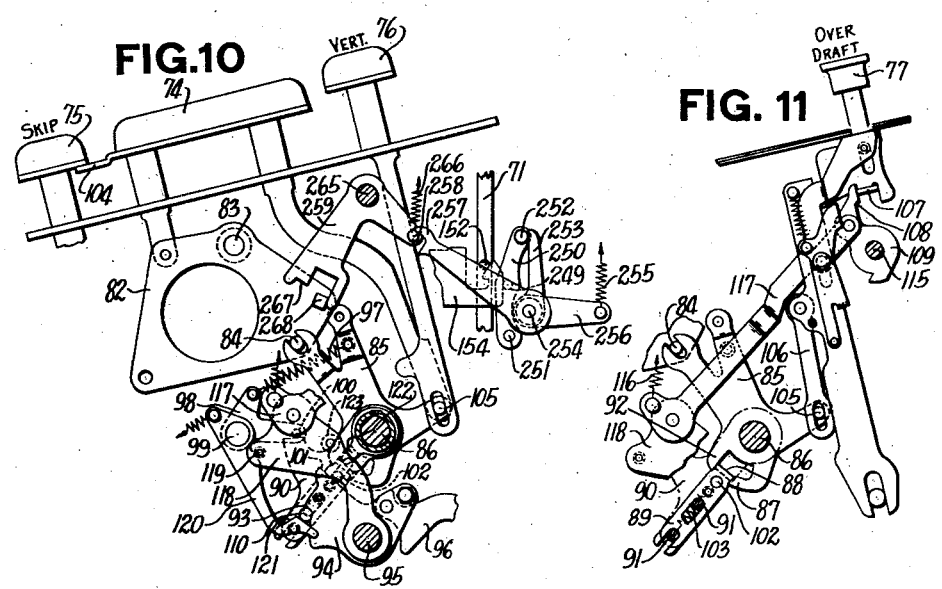
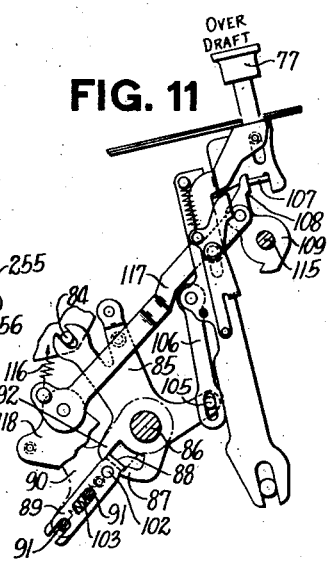
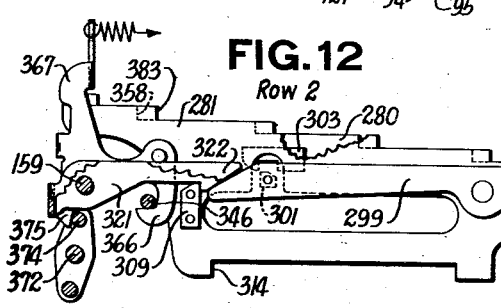
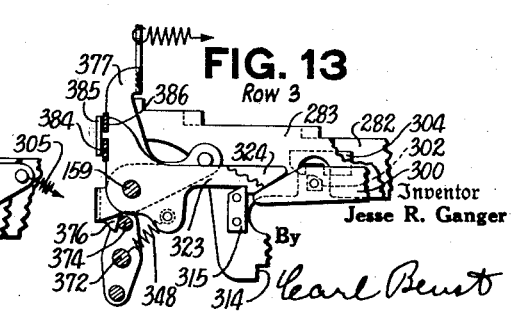
Inventor
Jesse R. Ganger
By Pearl Benst
His Attorney March 31, 1942.   J. R. GANGER   2,277,851
ACCOUNTING MACHINE
Filed Oct. 5, 1936   7 Sheets-Sheet 6

Inventor
Jesse R. Ganger
By Carl Benst
His Attorney

March 31, 1942.    J. R. GANGER    2,277,851
ACCOUNTING MACHINE
Filed Oct. 5, 1936    7 Sheets-Sheet 7
FIG. 19
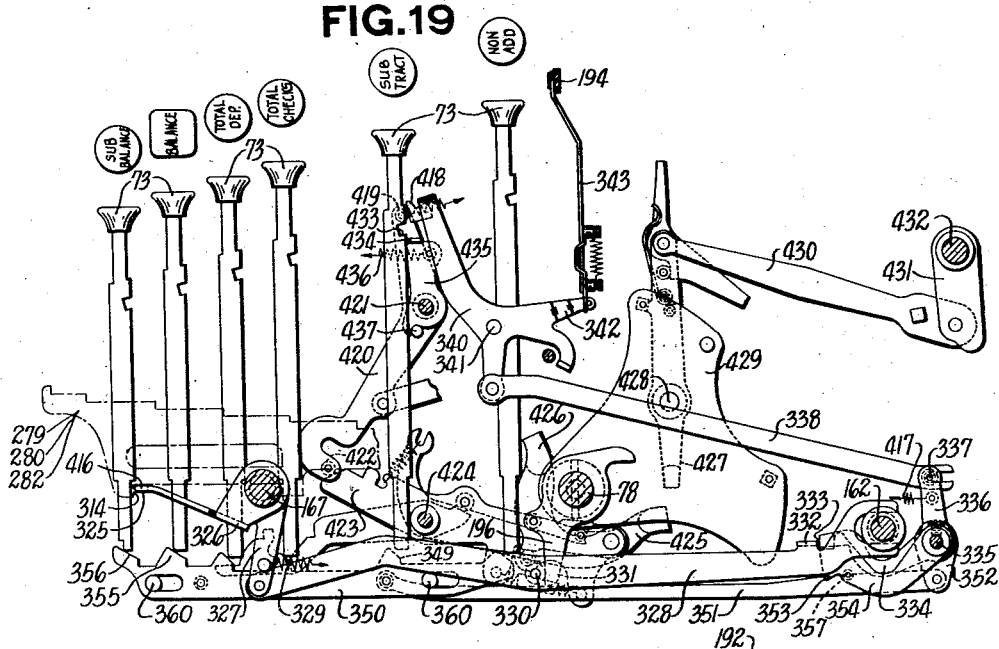
FIG. 20
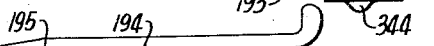
FIG. 21
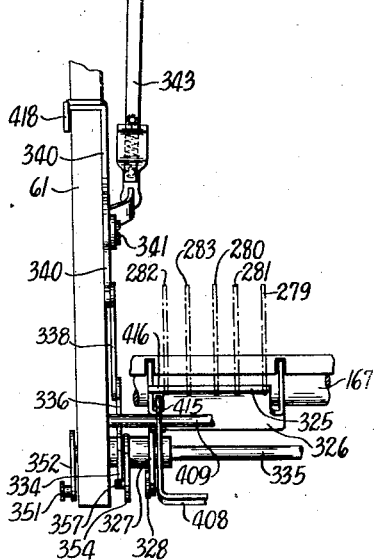
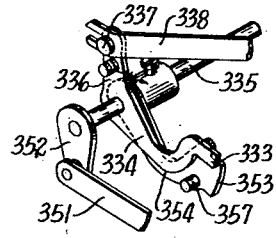
Inventor
Jesse R. Ganger
By
Carl Bent
His Attorney Patented Mar. 31, 1942

2,277,851

UNITED STATES PATENT OFFICE 2,277,851

ACCOUNTING MACHINE

Jesse R. Ganger, Dayton, Ohio, assignor to The National Cash Register Company, Dayton, Ohio, a corporation of Maryland Application October 5, 1936, Serial No. 104,001

28 Claims. (Cl. 235—60)

This invention relates to bookkeeping or accounting machines and the like, and is particularly directed to the keyboard mechanisms of machines of the type illustrated and described in Letters Patent of the United States No. 1,197,278 and No. 1,203,863, issued respectively September 5, 1916, and November 7, 1916, to Halcolm Ellis, and Patent No. 1,819,084, issued August 18, 1931, to Emil John Ens.

The present invention is shown embodied in the well known Ellis type of accounting machine illustrated and described in the above patents and in its present form is known as a "bank service machine," used for the balancing of individual checking accounts. However, it is not the desire to restrict or limit the use of this invention to the Ellis type of machine, as it may easily be adapted for use on various other types of machines. Neither is it the desire to limit this invention to bank service machines or to any particular business system, as the flexibility of said machine and the numerous features thereof admirably adapt it for the handling of practically any accounting problem in connection with present-day business systems.

In certain business systems it is often desirable to keep a count of certain items as they are listed. The balancing of individual checking accounts by banks is a good example. In this case a count of the checks drawn against the individual account is often kept for tax purposes, bookkeeping charges, or the like. It is therefore broadly an object of this invention to provide means to count the number of certain items of a transaction as the transactions are listed individually or collectively.

Another object of this invention is the provision of an item counting device, and means to automatically count single items thereon as they are listed in a separate accumulator. Said means may also be manually controlled to count one or a plurality of items when said items are entered singly or collectively.

A further object is the provision of means to automatically count a single item during each machine operation, said means also capable of being manually controlled to count one or more items during each machine operation.

Still another object is to supply means to automatically count "1" for each debit item as the amount of said item is deducted from a certain balance, and to provide key controlled means to disable the automatic counting means and to count one or more debit items when the total of said one or more items is deducted from a certain balance.

Another object is to provide means to render the operation of the automatic counting means dependent upon the depression of one or more amount keys and upon the selecting and conditioning of the balance totalizer for a subtract operation.

A still further object is to supply means to render the operation of the automatic and the key controlled item counting means dependent upon the selection and the conditioning of the balance totalizer for a subtract operation.

Another object is to furnish means to count in one totalizer and subtract simultaneously from another totalizer, said two totalizers being mounted on a common axis.

Still another object is to supply means to count in one totalizer while subtraction is being performed in another totalizer, both of said totalizers being on a common axis, and to perform total taking operations in both totalizers at the same time.

A further object is the provision of means to count in one totalizer and subtract simultaneously from another totalizer, said two totalizers being mounted on a common axle, and both totalizers being engaged with and disengaged from their actuators in subtract time.

Another object is to count in one totalizer by subtracting the complement of the amounts to be counted, while subtraction is being performed in another totalizer on the same axle.

Another object is to provide two totalizers on a single line operable to control printing during overdraft operations, and to provide means to control one of said totalizers to prevent that totalizer from operating to exert its control during preliminary transporting cycles of an overdraft operation.

Another object is the provision of means whereby conditioning of the machine for an overdraft operation renders the item counting device inoperative for the accumulation of items.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In the drawings:

Fig. 3 is a longitudinal sectional view taken just to the right of one of the amount banks, showing in particular the actuator mechanism for said amount bank.

Fig. 4 is a detail view of the row of amount keys shown in Fig. 3, showing the manner in which these keys are assembled to their order plate.

Fig. 5 is a longitudinal sectional view taken just to the right of one of the item counting banks, illustrating the main and auxiliary actuators for this particular bank.

Fig. 6 is a detail view of the item counting keys shown in Fig. 5, illustrating the manner in which these keys are assembled to their order plate.

Fig. 7 is a perspective view of the amount and check counting actuators, the row of control keys, and the machine starting mechanism. In a perspective view such as this, where the dot and dash lines of the framework show in front or on top of other parts, it indicates that such parts are in back of the framework.

Fig. 7—A is a detail view of part of the mechanism for controlling the item counting device in overdraft operations.

Fig. 8 is a detail view, as observed from the right of the machine, of the key releasing mechanism.

Fig. 9 is a detail view of the mechanism that locks the keys against depression or release during machine operations.

Fig. 10 is a side elevation, as observed from the right of the machine, of the starting mechanism.

Fig. 11 is a detail view of the overdraft key.

Figs. 12 and 13 are respectively fragmentary detail views of the main and auxiliary actuators for the second and third rows of item counting keys, and a part of their latch mechanisms.

Figure 14:
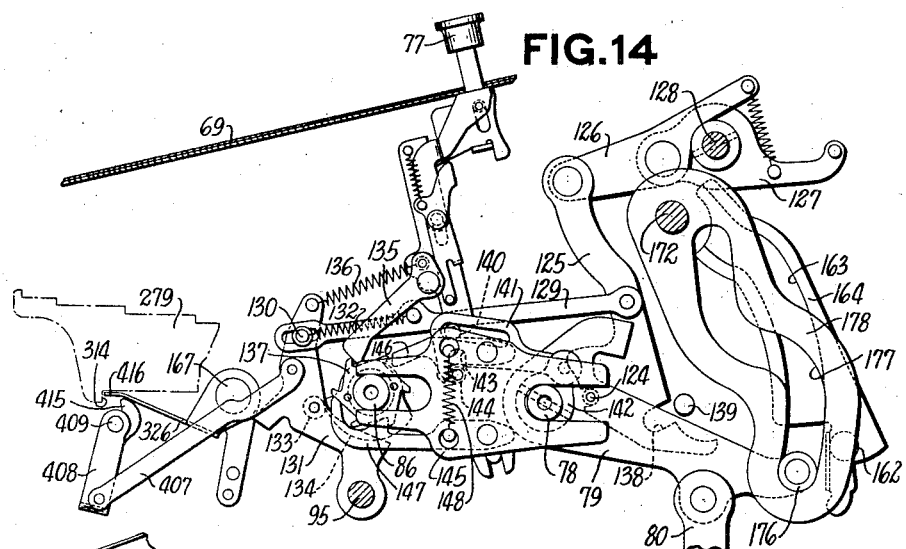

Fig. 14 is a side elevation as observed from the right, illustrating the machine operating mechanism and the manner in which the overdraft key controls the item counting actuators.

Figure 15:
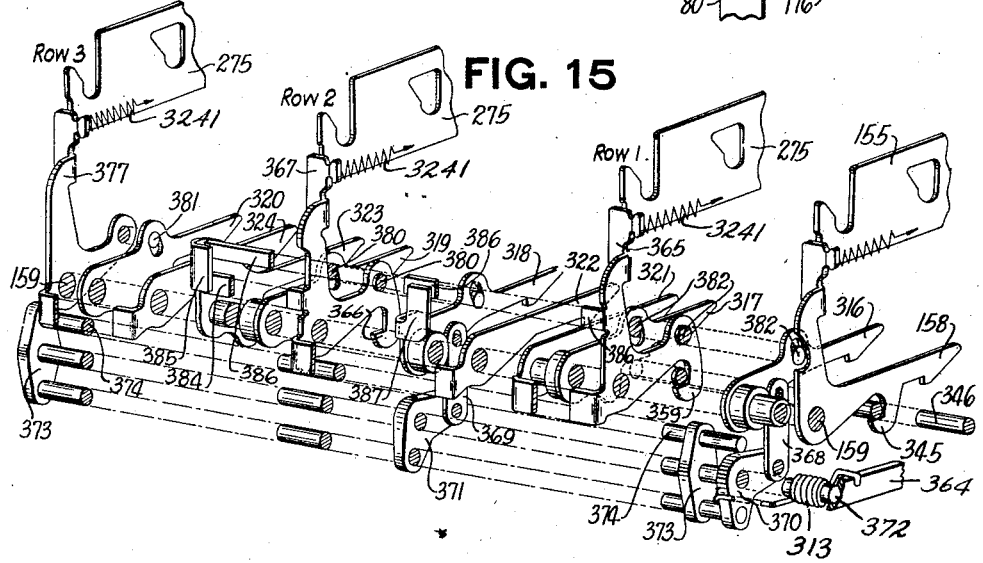

Fig. 15 is a disassembled perspective view of the latch mechanism for the actuators for the three rows of item counting keys.

Figures 16, 17, 18:
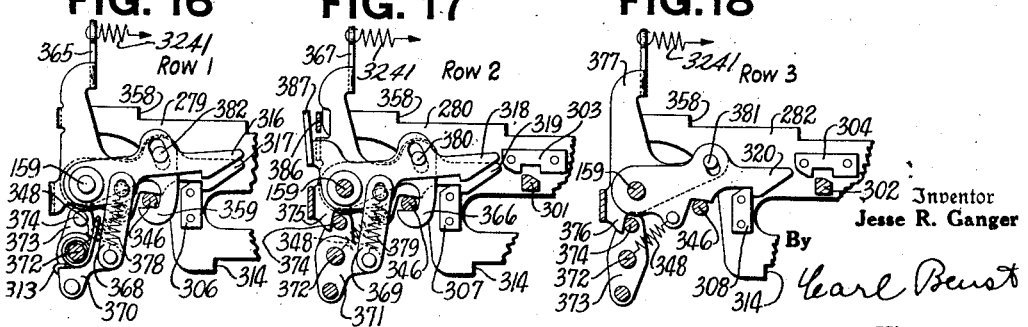

Figs. 16, 17 and 18 are respectively fragmentary detail views of the first, second and third rows of item counting keys, illustrating the latch mechanism for the main actuators for said rows of keys.

Fig. 19 is a side elevation showing the mechanism for controlling the operation of the actuators for the item counting banks, and the balance totalizer selecting and engaging mechanism.

Fig. 20 is a front view of a part of the mechanism shown in Fig. 19.

Fig. 21 is a perspective view showing in detail the controlling arms for the mechanism pictured in Figs. 19 and 20.

GENERAL DESCRIPTION

The machine embodying the instant invention is of the well known Ellis type and is provided with a traveling carriage similar to that used on typewriters, which may be automatically or manually tabulated from right to left during machine operations and which may be automatically returned from tabulated positions to starting position or to certain predetermined intermediate positions. Mechanism is also provided for skip tabulating the traveling carriage to predetermined columns.

The present machine has a plurality of rows of denominational amount keys, which when depressed control the positioning of their respective actuators commensurate with the value thereof, and said actuators in turn position their respective printing sectors or type carriers in accordance with the depressed amount keys and enter the amount in the selected totalizer or totalizers. The totalizers of the present machine are arranged in vertical pairs at the rear of the machine, and these totalizers include a balance totalizer in which positive or negative amounts may be entered, and one or more adding totalizers. The different totalizers are selected for addition, and the balance totalizer is selected for subtraction, by means of hanging bar levers in cooperation with stops mounted upon the traveling carriage in columnar positions thereof. The other functions of the machine, including non-add, sub-total and total operations, are controlled by means of a row of control keys located on the extreme left of the keyboard.

The machine embodying the present invention is provided with an overdraft mechanism for transposing the complementary amount of an overdraft into a true negative amount and printing this true negative amount upon record material wound around the platen roll. This machine is also supplied with an auxiliary keyboard located in front of the regular keyboard, which supports a plurality of date keys, a plurality of symbol keys, and a key for controlling the inking ribbon in subtract operations.

The present machine is provided with an item counting device, which is arranged to automatically count debit items one at a time as they are subtracted from the balance totalizer. The item counting device has three denominational order wheels similar to the balance totalizer wheels and they are mounted upon the same shaft as said balance totalizer wheels. Other than being upon the same shaft, the wheels of the item counting device have no structural connection whatever with the balance totalizer wheels. Amounts are transferred from lower to higher denomination wheels of the item counting device by means of a transfer mechanism similar to that used on the balance totalizer, and each of these wheels has an actuator mechanism which, in addition to being automatically controlled, may also be manually controlled by means of three rows of item counting keys occupying the space generally occupied by the three higher orders of amount keys.

As illustrated herein, only debit items are counted, and as the wheels of the item counting device are mounted upon the same shaft as the balance totalizer wheels, naturally these wheels are engaged with and disengaged from their actuators in subtracting time. Therefore in order to properly count the debit items when the balance totalizer is engaged in subtract time, it is necessary to subtract the complement of said items from the item counting wheels. Consequently, when one item is accumulated, the actuators reversely rotate the three item wheels nine steps to subtract the complement (999) of one therefrom.

Before single items will be automatically counted in the item counting device, it is necessary that two conditions be fulfilled, namely, the traveling carriage must be tabulated to a subtract column, and one or more amount keys must be depressed. Sometimes it is desirable not to count certain debit items, and in this case the item counting device may be rendered inactive by pressing a control key provided for that purpose. Depressing the control key also causes a symbol to be printed adjacent the item, to indicate that said item was not counted by mechanism shown and described in the above-mentioned patent to Ens.

Three cycles of movement of the operating mechanism are required to complete overdraft operations. All other operations are completed in one cycle of movement of said operating mechanism. Novel mechanism has been provided for locking the starting mechanism in effective position until the machine has operated through three cycles of movement in overdraft operations. This mechanism is rendered effective by depression of the overdraft key. In case the operator unintentionally retains any of the starting bars or the overdraft key depressed, at the end of machine operation, mechanism is provided to disconnect said starting bars and said overdraft key from the starting mechanism to prevent the machine from making unnecessary repeat operations.

In the following pages the mechanism pertinent to the instant invention will be described in detail.

DETAILED DESCRIPTION

Framework

Referring to Figs. 3, 5 and 7, the mechanism of the machine embodying this invention is supported by a right frame 60 and a left frame 61 mounted upon a machine base 62 and rigidly maintained in proper relation to each other by means of cross frames 63 and 64 and various other cross frames, rods and shafts. The mechanism of the machine is enclosed in a suitable case or cabinet 65 (Figs. 1 and 3) which is secured to the machine base 62. A traveling carriage 66, similar to that used on typewriters, is supported for lateral movement by means of ways thereon in cooperation with corresponding ways mounted upon the top of the case 65. The traveling carriage 66 rotatably supports a platen roll 67 which presents record material, wound therearound, to an inking ribbon (not shown) and a plurality of amount type sectors 68 (Fig. 3) and a plurality of check or item printing sectors 288 (Fig. 5) similar to the amount sectors 68.

Keyboard and operating mechanism

The framework of the main keyboard of the instant machine comprises a top plate 69, a right and a left end plate, (not shown), a partition plate 70 for each row of amount keys, and a partition plate 270 for each row of item-counting keys 72, and the top plate 69 is secured to the frames 60 and 61, to maintain the keyboard frame work in place.

The keys of the main keyboard include a plurality of rows of amount keys 71 (Figs. 1, 3, and 5), three rows of item counting keys 72, a row of control keys 73, a starting bar 74, a "Skip" tabulating starting bar 75, a "Vertical" feed starting bar 76, and an "Overdraft" key 77. Depressing any one of the starting bars 74, 75 or 76, causes a main shaft 78 (Fig. 14) journaled in the frames 60 and 61, to be operated through one cycle of movement, which is the proper movement for operating the machine in non-adding, adding, subtracting, sub-total and total operations. Depressing the Overdraft key 77 causes the main shaft 78 to operate through three cycles of movement to effect an overdraft operation. Secured on the righthand end of the shaft 78 is an arm 79 connected by a link 80 to the driven member of a clutch device (not shown), the driving member of which is operatively connected to an electric motor of conventional design but preferably one of the character illustrated and described in Letters Patent of the United States No. 1,601,102, issued September 28, 1926, to F. W. Bernau.

The present machine has an auxiliary keyboard 81 (Fig. 3) located directly in front of the main keyboard, supporting a plurality of date printing keys, a plurality of symbol printing keys, and a key for controlling the color of the bichrome ribbon in subtract operations. The auxiliary keyboard is mounted upon extensions of the base 62 and is enclosed by an extension of the cabinet 65.

Depressing the starting bar 74 (Fig. 10) rocks a lever 82 counter-clockwise on its pivot 83, which, by means of a stud 84 in said lever, in cooperation with a bifurcated extension of a lever 85 (see also Fig. 11), loose on a shaft 86 journaled in the right frame 60 and a support plate (not shown), rocks said lever 85 clockwise. The lever 85 has a hook-shaped extension 87 and a finger 92 which embrace a bent-over extension 88 of a slide 89, which is slidably mounted upon an arm 90, loose on the shaft 86 by means of horizontal slots in said slide 89, in cooperation with studs 91 in said arms 90. Thus the lever 85 moves the slide 89 and the arm 90 clockwise in unison therewith to move a stud 110 carried by said arm 90 out of engagement with a shoulder 93 of a release arm 94, loose on a stud 95 secured in the frame 60. The arm 94 upon being released is rocked counter-clockwise by a spring (not shown) which, by means of a link 96, one end of which is connected to said arm 94, closes the switch to the operating motor and engages the clutch mechanism to cause the main shaft 78 to operate through one cycle of movement.

After the shaft 78 has completed its one cycle of movement, the link 96 (Fig. 10) is automatically returned rearwardly to disengage the clutch mechanism, to open the motor switch and to return the arm 94 clockwise to move the shoulder 93 beyond the stud 110. This permits a spring 97, tensioned between the lever 85 and a bell crank 98 fulcrumed on a stationary stud 99, to return said lever 85 counter-clockwise, and by means of a stud 100 in said bell crank 98, in cooperation with an extension of the arm 90, to return said arm 90 counter-clockwise in unison with the lever 85 to cause the stud 110 to reengage the shoulder 93 to retain the arm 94 and the link 96 in untripped positions after the mechanism which restores these parts moves out of cooperative engagement therewith.

In case the starting bar 74, or any of the bars that set the machine in motion, is unintentionally retained depressed, restoration of the arm 94 causes a projection 101 thereof to engage a stud 102 in the slide 89 (Figs. 10 and 11) to shift said slide upwardly against the action of a spring 103 to move the bent-over ear 88 out of engagement with the hook 87 and into a clearance slot formed by said hook and the finger 92. This permits the spring 97 and the bell crank 98 to return the arm 90 independently of the lever 85 to cause the stud 110 to engage the shoulder 93 to retain the arm 94 in untripped position to prevent a repeat operation of the machine. When, thereafter, the depressed starting bar is released, the slide 89 is again lowered to enter its flange 88 between hook 87 and finger 92.

An extension 104 of the plate that supports the starting bar 74 (Fig. 10) underlies the "Skip"

tabulating starting bar 75. Consequently depression of the bar 75 also depresses the starting bar 74 to set the machine in motion, and in addition causes the traveling carriage 66 (Fig. 3) to be skip tabulated to a predetermined columnar position in the manner shown and described in the patent to Christian, No. 2,082,098. The "Vertical" feed starting bar 76 has a slot in the lower end of the stem thereof, which cooperates with a stud 105 in an extension of the lever 85. Therefore depression of the vertical feed starting bar 76 rocks the lever 85 clockwise to set the machine in motion in the manner explained above, and in addition causes the platen roll 67 (Fig. 3) to be rotated to line-space the record material wound therearound.

Overdraft key and associated mechanism

Depressing the "Overdraft" key 77 (Fig. 11) by means of a link 106, the upper end of which is pivotally connected to said Overdraft key and the lower end of which is slotted to embrace the stud 105 in the lever 85, rocks said lever 85 clockwise to set the machine in motion in the manner explained above. Depressing the "Overdraft" key 77 causes the machine starting mechanism to be locked against restoration until the machine has operated through three cycles of movement to effect an overdraft operation. This is accomplished in the following manner:

Depressing the "Overdraft" key 77 (Fig. 11) moves a bent-over ear 107 on the stem thereof beyond a shoulder 108 on a latch 109 loose on a stud 115 in the main frame 60. A spring 116, one end of which is connected to a link 117 connecting the latch 109 to a latch releasing lever 118, pivoted on a stud 95 (Fig. 10), urges said lever 118 and the latch 109 clockwise to move the shoulder 108 in the path of the ear 107 to latch the "Overdraft" key 77 in depressed position. Clockwise movement of the lever 118 withdraws a stud 119 therein from a raised surface of a pawl 120 rotatable on the stud 99 and permits said pawl to be spring-urged counter-clockwise to move a surface 121 thereof in the path of the stud 110, to hold said stud 110 out of the path of the shoulder 93 upon restoration of the starting mechanism at the end of one cycle of operation, as explained earlier herein. This permits the machine to operate through three cycles without interruption to perform an overdraft operation.

Near the end of the third cycle of an overdraft operation a cam 122 (Figs. 10 and 11) loose on the stud 86 and which makes one counter-clockwise revolution in overdraft operations, engages a roller 123 mounted on the lever 118 and rocks said lever and the latch 109 counter-clockwise to disengage the shoulder 108 from the ear 107 to permit the "Overdraft" key 77 to be spring-returned upwardly to undepressed position. When the lobe of the cam 122 moves beyond the roller 123, the spring 116 returns the lever 118 and the latch 109 clockwise until a flat surface of said latch, adjacent the shoulder 108, contacts the edge of the ear 107. This positions the pawl 120 as shown in Fig. 10, so that the surface 121 is maintained out of the path of the stud 110.

In the first two cycles of an overdraft operation the complementary amount of the overdraft is transposed to a true negative balance and during the third cycle of an overdraft operation the balance totalizer is cleared and the true negative balance is printed upon record material wound around the platen roll. This overdraft mechanism is not illustrated or described in detail herein, being that shown, described, and claimed in the United States patent to Lee, No. 2,079,355, issued May 4, 1937, on an application filed April 14, 1932. In order to prevent erroneous entries by the printing mechanism during the first two, or transposing, cycles of an overdraft operation, the printing mechanism is rendered inoperative in the following manner:

Referring to Fig. 14, the machine operating arm 79 carries a stud 124, which normally engages a notch in a link 125, the upper end of which is pivotally connected to an arm 126 flexibly connected to another arm 127 secured on a printer shaft 128 opposite ends of which are journaled in the right frame 60, and in the framework of the printer mechanism. Oscillation of the arm 79, in the manner explained previously, by means of the link 125 oscillates the printer shaft 128 first clockwise and back to normal position to cause the printing mechanism to function. One end of a link 129 is pivotally connected to the link 125, while the other end of said link is slotted to embrace a stud 130 in a lever 131 pivoted on the stud 95. A spring 132, tensioned between the stud 130 and the link 129, urges the link 125 clockwise to normally maintain the notch therein in engagement with the stud 124 in the arm 79. The spring 132 also urges the lever 131 clockwise to normally maintain a roller 133 carried thereby in engagement with the periphery of a plate cam 134 integral with the cam 122 (Fig. 10) rotatably mounted upon the stud 86.

Loosely mounted on the stem of the Overdraft key 77 (Fig. 14) is a pawl 135, urged counter-clockwise by a spring 136 into engagement with the teeth of a ratchet 137 integral with the cams 122 (Fig. 10) and 134. Depressing the Overdraft key 77 causes the pawl 135, in cooperation with the teeth of the ratchet 137, to rotate said ratchet and the cam 134 a slight distance counter-clockwise to move the high portion of the periphery of said cam 134 out of engagement with the roller 133 to release the lever 131 to the action of a spring 136, which moves said lever clockwise until the roller 133 engages the low surface of the periphery of the cam 134. Clockwise movement of the lever 131, by means of the link 129, shifts the link 125 counter-clockwise to disengage said link from the stud 124 and to engage a notch 138 in said link with a stationary stud 139 in the right frame 60. In the course of an overdraft operation and in a manner presently to be described, the cam 134 receives one counter-clockwise revolution to return the lever 131 counter-clockwise near the end of the second cycle of an overdraft operation to reengage the link 125 with the stud 124, so that the printer mechanism will function in the third cycle of an overdraft operation to print the true negative balance.

The ratchet 137 (Fig. 14) and the cams 134 and 122 are driven one counter-clockwise revolution each overdraft operation in the following manner: Depressing the Overdraft key 77 causes a stud 140 in the stem thereof, in cooperation with a slot in a latch 141 pivotally connected to a crank 142 secured on the shaft 78, to engage a notch 143 in said latch with a stud 144 in a slide 145, reciprocably mounted by means of horizontal slots therein, in cooperation with the main shaft 78 and the stud 86. Initial movement counter-clockwise of the main shaft 78 moves the slide 145 forwardly or towards the left, as viewed in Fig. 14, to cause a pawl 146 carried thereby to engage one of the teeth of the ratchet 137 to rotate said ratchet and the cams assembled thereto, from the position to which the cams were moved by the pawl 135 to complete one-sixth of a revolution in a counter-clockwise direction. Return movement rearwardly of the slide 145 upon return movement clockwise of the main shaft 78 causes another pawl 147 carried thereby to engage one of the teeth of the ratchet 137 to rotate said ratchet and the cams assembled thereto another sixth of a revolution in a counter-clockwise direction. A spring 148 stretched between the pawls 146 and 147 urges said pawls toward each other to maintain the teeth of said pawls in communication with the teeth of the ratchet wheel 137. Inasmuch as the main shaft 78 makes three cycles of movement in an overdraft operation, the slide 145 will be reciprocated back and forth three times, which due to the push-pull action of the pawls 146 and 147 will rotate the ratchet 137 and the cams assembled thereto one complete counter-clockwise revolution. Restoration of the Overdraft key 77 to undepressed position at the end of an overdraft operation disengages the notch 143 in the latch 141 from the stud 144. It is therefore obvious that the slide 144 and associated mechanism function only in overdraft operations.

Amount keys

The machine embodying the instant invention has nine denominational rows of amount keys and inasmuch as the mechanism for each of the nine rows of amount keys is substantially alike, it is believed that the description of one of the amount banks and its associated mechanism will be sufficient for the purpose of this specification. The row of amount keys illustrated in Fig. 3 and their associated mechanism will now be described in detail.

Figures 1, 2:
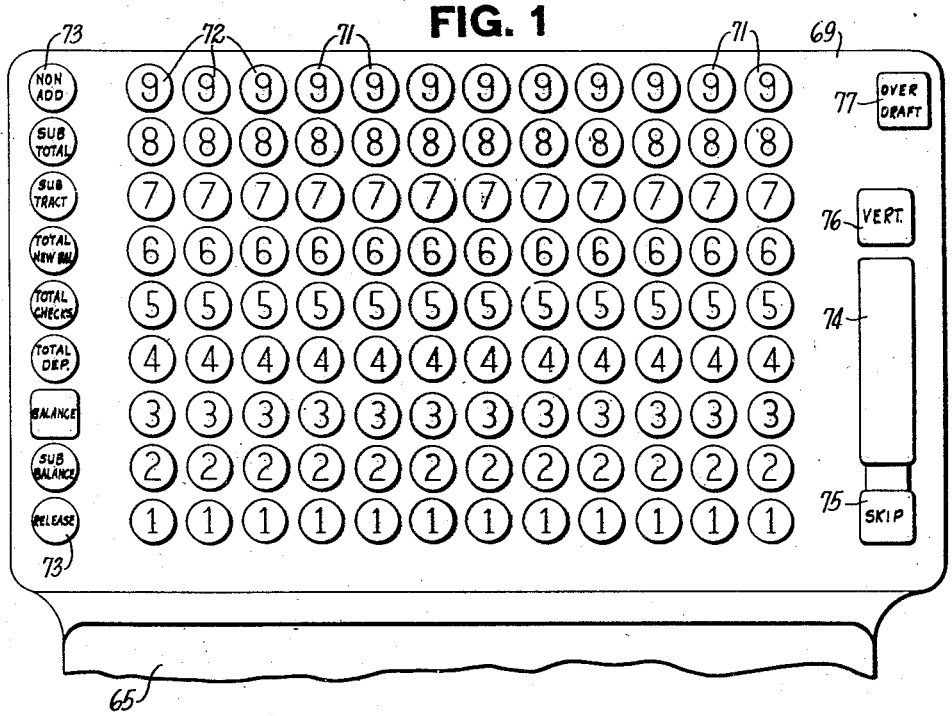
Fig. 1 is a diagrammatic plan view of the keyboard of the machine of the instant invention.
Fig. 2 is a facsimile of a fragment of a ledger sheet prepared in the machine of the present invention.

Referring to Figs. 1, 3 and 4, the upper ends of the stems of the amount keys 71 extend through openings in the keyboard plate 69, while each of said amount keys carries a stud 149, which extends through a vertical slot in the partition plate 70, for the particular amount banks shown in Figs. 3 and 4. Spring clips 150 (Fig. 4), in cooperation with annular grooves in the studs 149, retain said studs in the vertical slot in the plate 70. A coil spring 151 laced around studs 152 in the key stem and studs 153 in the plate 70, returns the amount keys 71 upwardly to undepressed position when they are released near the end of the machine operation, after having been depressed. Associated with each amount bank is a detent plate 154 and a control plate 155, mounted to slide horizontally on the plate 70 by means of four rollers on four studs 156, secured in said plate 70.

Depressing an amount key causes the pin 152 therein, in cooperation with its corresponding hook-shaped projection formed in apertures in the locking plate 154, to shift said plate rearwardly or toward the right, as here viewed, against the tension of a spring 157, opposite ends of which are connected to the plates 154 and 155. When the pin 152 passes beyond the hook-shaped projection, the spring 157 returns the plate 154 forwardly to cause the hook to latch over the flat-topped surface of the pin 152 to obstruct upward movement of the depressed key 71 under influence of the spring 151, and to lock said key in depressed position. Likewise depressing an amount key causes the pin 152 in cooperation with its corresponding angular opening in the control plate 155 to shift said plate forwardly against the action of the spring 157 to rock a zero latch 158 counter-clockwise on its supporting shaft 159, mounted in the keyboard framework, to disengage the hook of said zero latch from a lug 165 on an amount actuator rack 166 for this particular amount bank. The actuator 166 is mounted for horizontal reciprocating movement by means of a slotted rod 167, supported by the frames 60 and 61, in cooperation with a notched portion of the front end of said actuator, and by means of a bar 168 extending between the frames 60 and 61, in cooperation with the slotted end of the actuator 166.

The actuator 166 has a vertical slot 169 therein, which engages a stud 170 in a downward extension of a reducer segment 171 rotatably mounted on a shaft 172 journaled in the frames 60 and 61. A spring 173 stretched between the segment 171 and a bail 174 of a leading frame, normally maintains a beak of said segment 171 in contact with a bail 174. The bail 174 extends between two similar arms 175, only one here shown, which straddle all the reducer segments and which are secured on the shaft 172. The main operating shaft 78 (Fig. 14) is operatively connected to the leading frame shaft 172 by a roller 176 carried by the arm 79, in cooperation with a camming slot 177 in an arm 178 secured to the shaft 172. It is therefore apparent that oscillating movement of the main shaft 78 rocks the leading frame shaft 172 first counter-clockwise and then back to normal position.

When the machine is operated without an amount key being depressed, in this particular amount bank, the zero latch 158 (Fig. 3) retains the actuator 166 in zero position, as here shown, and oscillating movement of the leading frame bail 174 stretches the spring 173 without imparting any movement to the segment 171. Depressing an amount key rocks the zero latch 158 to ineffective position and moves the stud 149 in said amount key into the path of the corresponding one of a series of graduated steps 179 cut in the top surface of the actuators 166. Upon operation of the machine, initial movement clockwise of the carrying frame bail 174, by means of the spring 173, carries the reducer segment 171 and the actuator 166 in unison therewith until the corresponding step 179 engages the stud 149 of the depressed amount key. This differentially positions the actuator 166 and the segment 171 in proportion to the value of the depressed amount key, and the spring 173 permits the leading frame bail 174 to complete its initial movement counter-clockwise, independently of the segment 171 and the actuator 166. A link 180 connects an arm of the segment 171 to the type sector 68 for this particular amount bank, and consequently transmits the differential movement of said segment 171 to said type sector 68. The sector 68 is pivotally connected to an arm 181 rotatably mounted on the printer shaft 128.

After the type sector 68 has been positioned and the leading frame 174 has completed its initial movement counter-clockwise, an aliner bar 160 is rocked into engagement with one of a series of tooth spaces in the segment 171 to aline said segment and the printing sector in set positions. The aliner 160 extends between similar arms 161 (only one here shown) secured to an aliner shaft 162 journaled in the frames 60 and 61. Initial movement counter-clockwise of the arm 79 (Fig. 14) causes the roller 176, in cooperation with a camming groove 163 in an arm 164 connected to the shaft 162, to rock said arm and said shaft clockwise to engage the aliner bar 160 with the segment 171. After printing is completed and prior to return movement of the leading frame bail 174, return movement of the arm 79 disengages the aliner from the segment 171. Immediately after the aliner 160 is engaged with the segment 171 a printer release trigger 182 (Fig. 3) is rocked counter-clockwise out of engagement with a tooth 183 of a plate 184, connected to the arm 181, to release said arm to the action of a spring 185, to cause the type sector 68 to make an impression stroke to imprint the value of the depressed key upon the record material wound around the platen roll 67. The means for rocking the release trigger 182 is fully shown and described in the United States Patent No. 1,197,276, issued to Halcolm Ellis on September 5, 1916

When no amount key is depressed, a tooth 186 of a zero elimination pawl or order hook 187, pivoted on a shaft 188 supported by the printer framework, in cooperation with a corresponding tooth in the plate 184, retains said plate, the arm 181 and the printing sector 68 against printing movement when the trigger 182 is released. However, when a key is depressed, movement of the actuator 166 and the segment 171 away from zero position causes a stud 189, in an extension of said segment 171, in cooperation with an arcuate surface 190 on an extending tail of the zero elimination pawl 187, to rock the tooth 186 of said pawl out of engagement with the tooth in the plate 184 to permit the type sector 68 to make a printing stroke.

*Totalizers and selection thereof*

The righthand end of the actuator 166 has two sets of rack teeth adapted to cooperate with corresponding wheels of a #1 or balance totalizer, and a #2 or adding totalizer, mounted in a totalizer framework 191 secured to the frames 60 and 61. While only two totalizers are here shown, it is but a matter of assembly to add additional totalizers by connecting them to the framework 191.

The totalizers are selected and the machine is conditioned for adding and subtracting operations by means fully shown and described in the above Ellis Patent No. 1,197,276, which means is under control of tappets 192 (Figs. 3 and 20), mounted on a stop bar 193 secured to the traveling carriage 66, in cooperation with hanging bar levers similar to a subtract hanging bar lever 194 mounted on a stud 195 secured in the cross frame 64. In adding operations, after the leading frame bail 174 has completed its initial movement counter-clockwise and the actuator 166 and the segment 171 have been differentially positioned, the corresponding wheel of the selected totalizer is engaged with the teeth of said rack and return movement forwardly, or clockwise, of the bail 174 picks up the segment 171 and returns it and the actuator 166 to zero position, to rotate the wheel of the selected totalizer a corresponding distance, to accumulate therein the amount set up on the amount keys. In subtract operations, the wheel of the selected totalizer is engaged with the actuator 166 prior to its initial movement rearwardly and is consequently rotated in a reverse direction to subtract therefrom the amount set up on the keyboard. Depressing the "Non-add" key 73 (Fig. 1) conditions the machine for a non-adding operation in which the amount set up on the keyboard is merely printed and not entered in any of the totalizers.

In addition to the subtract hanging bar lever 194, the balance totalizer may be selected for a subtract operation by means of the "Subtract" key 73. The different totalizers are selected and the machine is conditioned for total and sub-total operations by means of the "Total" and "Sub-total" and the "Balance" and "Sub-balance" control keys 73. The #1 or balance totalizer has the well known dual transfer mechanism shown and described in Letters Patent of the United States No. 1,203,863 referred to above, for transferring amounts from lower to higher denominations. The transfer mechanism is shifted from adding to subtracting position depending upon the type of operation being performed. The #2 or adding totalizer has a single transfer mechanism for transferring amounts from lower to higher denominations.

In the beginning of sub-total and total operations the control plate 155 (Fig. 3) is shifted forwardly in a manner presently to be described, to move the zero latch 158 to ineffective position so that the actuator 166 is free to move upon oscillation of the leading frame bail 174. Prior to initial movement rearwardly of the actuator 166 the wheel of the selected totalizer is engaged therewith by mechanism described in the above-named Patent No. 1,197,276, whereupon initial movement of said actuator, under influence of the shaft 172 and the leading frame 174, reversely rotates the wheel of the selected totalizer until said wheel is stopped in zero position by means of the tooth on a tripping cam integral therewith coming in contact with its associated add transfer pawl. This positions the actuator 166 and the type sector 68 commensurate with the amount of the totalizer wheel so that this amount may be recorded when the printing sector 68 makes its printing stroke. It will be noted that the contour of the camming slot 177 in the arm 178 (Fig. 14) permits the shaft 172 and the leading frame to dwell for an appreciable time at the terminus of their movement in either direction. In total operations, during the dwell of the leading frame after its initial movement counter-clockwise, the wheel of the selected totalizer is disengaged from the actuator 166 and as said wheel is standing at zero, the totalizer remains in a cleared condition.

In sub-total operations, the wheel of the selected totalizer remains engaged with the actuator 166 during its return movement forwardly and is consequently returned to its original position, as described in said Patent No. 1,197,276.

*Amount key locking mechanism*

Mechanism which cooperates with the locking plate, or detent 154, locks the amount keys against depression or release during machine operations.

Referring to Figs. 5 and 9, secured on the main shaft 78 is an arm 196 with a stud 197, which cooperates with a projection 198 on a pitman 199 slidably mounted by means of a bifurcated lower end thereof in cooperation with a collar on the shaft 78, and by means of a slot, in said pitman, in cooperation with a stationary stud 200. The upper end of the pitman 199 cooperates with a stud 201 in an extension of an arm 202 secured on a shaft 203 journaled in the keyboard framework. A spring 204, one end of which is connected to an extension of the arm 202, urges said arm and the shaft 203 counter-clockwise to normally maintain the stud 201 in contact with the upper end of the pitman 199.

Intial movement counter-clockwise of the main shaft 78 and the arm 196 withdraws the stud 197 from the projection 198 and permits the spring 204 to move the arm 202 and the shaft 203 counter-clockwise to shift the pitman 199 downwardly. Counter-clockwise movement of the shaft 203 moves a lug 205 (Figs. 3 and 8) carried thereby into the path of a shoulder 206 on a projection of the locking detent 154 to prevent movement of said detent during machine operations. In adding, non-adding and subtracting operations, this locks the depressed amount keys against release and the undepressed amount keys against depression and in total-taking operations it locks all the amount keys against depression. Near the end of return movement clockwise of the shaft 78 and the arm 196, the pitman 199 is returned upwardly to rock the lug 205 out of the path of the shoulder 206, in which position the parts are maintained when the machine is at rest.

Key releasing mechanism

Mechanism is provided for automatically releasing the depressed amount keys at the end of non-adding, adding and subtracting operations, and for releasing any amount keys carelessly or inadvertently depressed, prior to a total or a sub-total operation, in the beginning of said operations. Manual means is also provided for releasing the depressed amount keys.

Calling attention to Figs. 1, 3 and 8, the "Release" key 73 has pivotally connected thereto one end of a toggle link 207, the other end of which is bifurcated to straddle a stud 208 in a bar 209 mounted for horizontal sliding movement by means of horizontal slots therein in cooperation with studs 215 and 216 in the left frame 61. Depressing the release key 73 shifts the bar 209 rearwardly, causing a stud 217 in an upward extension thereof, in cooperation with an inverted V-slot in an arm 218 secured on a shaft 219 journaled in the keyboard framework, to shift said arm and said shaft counter-clockwise. An arm 220 secured on the shaft 219 is rocked counter-clockwise in unison therewith causing a stud 221 carried by said arm, in cooperation with opposed angular surfaces on projections 222 and 223 of the control plate 155 and the locking plate 154, to shift said control plate forwardly for a purpose presently to be described and to shift said locking plate 154 rearwardly to disengage one of the hooks in said locking plate from the stud 152 in the depressed amount key. This frees the depressed key to the action of the spring 151 (Fig. 4), which immediately returns said key upwardly to undepressed position.

Pivoted on a stud 224 (Fig. 8) carried by the bar 209 is a key release pawl 225 urged clockwise by a torsion spring 226 to normally maintain the bottom surface of the hook 227 thereon in resilient engagement with a roller 228, mounted on a disc 229, secured on the main shaft 78. Initial movement counter-clockwise of the shaft 78 and the disc 229 causes the roller 228 to move beyond the hook 227, whereupon the torsion spring 226 immediately rocks the pawl 225 clockwise to move the hook into the path of said roller 228. Return movement clockwise of the shaft 78 and the disc 229 causes the roller 228 to engage the hook 227 to shift the bar 209 rearwardly to rock the shaft 219 and the arm 220 counter-clockwise to shift the locking plate 154 rearwardly to release the depressed amount keys in the manner explained above. Before the shaft 78 and the disc 229 complete their return movment clockwise, an upward projection 230 of the pawl 225 engages a stationary stud 231, which disengages the hook 227 from the roller 228 and permits return of the bar 209 and associated mechanism to normal position by the spring 157 (Fig. 3), tensioned between the plates 154 and 155.

The mechanism described above automatically releases the depressed amount keys in non-adding, adding and subtracting operations. In total and sub-total operations it is necessary that the automatic amount key releasing mechanism function in the early part of an operation, in order to release any amount keys carelessly or inadvertently depressed prior to said operations.

A latch 232 (Fig. 8) pivoted on a stud 233 in the left frame 61 in cooperation with a notch in the stem of the "Sub-balance" key 73 is adapted to retain said balance key depressed. The latch 232 has pivotally connected to the lower end thereof a lever 234, urged counter-clockwise by a spring 235 against a stop collar 236 on the stud 216. A stud 237, carried by said lever 234, in cooperation with a tail on an amount key release pawl 238, pivoted at 239 to a downward extension of the bar 209, maintains a notch 240 in said pawl 238 out of engagement with a roller 241, mounted on the lower end of a lever 242 pivoted at 243 to the left frame 61. A spring 244 urges the lever 242 clockwise to normally maintain a camming surface thereon in resilient engagement with a roller 245 mounted on the disc 229.

Depressing any of the "Total" keys or the "Sub-total," the "Balance" or the "Sub-balance" key 73 (Fig. 1), by mechanism not here shown but well known in the art, and shown and described in United States Letters Patent No. 1,731,701, issued to F. W. Bernau on October 15, 1929, rocks the lever 234 (Fig. 8) clockwise to retract the stud 237 from the tail of the pawl 238 to permit the torsion spring 226 to rock the notch 240 into engagement with the roller 241. Thereupon initial movement counter-clockwise of the shaft 78 and the disc 229 causes the roller 245 to engage a node 246 of the camming surface on the lever 242 to rock said lever counter-clockwise to shift the pawl 238 and the bar 209 rearwardly. Rearward movement of the bar 209 rocks the shaft 219 and the arm 220 counter-clockwise to shift the locking detent 154 rearwardly to release any amount key which might have been depressed carelessly or through inadvertence.

Inasmuch as no amount keys are depressed in total and sub-total operations, it is obviously necessary to move the zero latch 158 (Fig. 3) to ineffective position in some manner, so that the rack 166 is free to be positioned by its corresponding totalizer wheels, and this is accomplished in the following manner.

Counter-clockwise movement of the arm 220 also shifts the control plate 155 forwardly to rock the zero latch 158 (Fig. 3) out of engagement with the projection 165 to free the actuator 166 so that it may be positioned by its corresponding totalizer wheel.

After the bar 209 (Fig. 8) has moved rearwardly a sufficient amount to release the improperly depressed amount keys and to move the zero latches to ineffective positions, a roller 247 carried by the disc 229 engages a rounded camming surface 248 on the pawl 238 and rocks said pawl clockwise to disengage the notch 240 from the roller 241 to permit the bar 209 and associated parts to be spring-returned to normal position, as here shown. When the depressed total or sub-total key is released, the lever 234 is spring-returned counter-clockwise to normal position to cause the stud 237 to engage the tail of the pawl 238 to retain said pawl in ineffective position after the shaft 78 and the disc 229 have been returned clockwise to normal position, as here shown, and the roller 247 is moved out of the path of the camming surface 240.

*Mechanism to prevent release of the machine when an amount key is partially depressed*

In order to prevent release of the machine for operation when an amount key is partially depressed, mechanism shown in Figs. 3, 5, and 10 locks the release mechanism against operation until the amount key is either fully depressed or fully released. Depressing an amount key 71 causes the stud 152 therein, in cooperation with the angular nose of a corresponding hook, to rock the locking detent 154 rearwardly until said stud 152 passes beyond said hook, whereupon the detent 154 is spring returned forwardly to latch the hook over the stud 152 to retain said amount key depressed. A rod 249 extends across the keyboard framework, in the path of the ends of the locking plates or detents 154. The rod 249 is supported by two arms 250 and 260 secured on opposite ends of a shaft 251 journaled in the partition plates 70 and a plurality of similar partition plates 270 for the item counting keys 72 (Fig. 5).

Rearward movement of the detent 154 (Fig. 3) rocks the rod 249 and the arms 250 and 260 clockwise, causing a stud 252 in the upper end of the arm 250 in cooperation with an arm 253, secured on a shaft 254 journaled in the frames 60 and 61, to rock said arm and said shaft clockwise against the action of a spring 255 (Fig. 10), one end of which is connected to a crank 256 secured on the shaft 254. Clockwise movement of the shaft 254 retracts the finger of an arm 257, secured thereon, from a stud 258 in an extension of a starting bar locking plate 259 pivoted on a stud 265 in the frame 60. This permits a spring 266 to rock said locking plate 259 counter-clockwise to move a shoulder 267 thereon into the path of a square stud 268 secured in the lever 82 to block counter-clockwise releasing movement of said lever 82. It is therefore evident that if an amount key is retained partially depressed, the shoulder 267 will be retained in the path of the stud 268 to prevent operation of the machine until the amount key is either fully depressed or fully released. Normally, a clearance notch in the end of the locking plate 259 permits counter-clockwise releasing movement of the lever 82.

*Item counting mechanism*

The machine embodying the present invention is provided with an item counting device which is controlled by three rows of keys 72 (Fig. 1) occupying the space generally occupied by the three higher orders of amount keys. The three rows of item counting keys control actuators which in turn control the positioning of item counting wheels mounted upon the same axle as the #1 or balance totalizer wheels. Other than being upon the same axle, the item counting wheels have no structural connection whatever with the balance totalizer wheels. A transfer mechanism, similar to that used in the balance totalizer, transfers amounts from lower to higher order item counting wheels. Being upon the same axle as the #1 or balance totalizer amount wheels, the item counting wheels are engaged with their respective actuators in exactly the same time as the wheels of the balance totalizer are engaged with their actuators.

In the present arrangement only debit items are counted, and naturally at this time the wheels of the item counting device are engaged with and disengaged from their actuators in subtracting time. Therefore in order to count the debit items, the complement of the number of the items is subtracted from the item counting wheels. For example, with the three item counting wheels in zero position, in order to count one item it is necessary to rotate the three wheels reversely nine steps to subtract the complement of one (999) therefrom, leaving said wheels standing at 001. Obviously, during such an operation, the printing sectors associated with the item counting wheels will go to nine, and if allowed to print would record an erroneous result. Therefore in order to prevent such an erroneous recording, the item counting type carriers are allowed to print only in balance operations, at which time the wheels of the item counting device position the printing sectors. Before items can be counted in the item counting wheels either automatically or by using the item counting keys, it is necessary that the traveling carriage be tabulated to a subtract column.

The item counting keys are used when it is desirable to enter more than one item at a time. For example, in banking institutions often a number of checks, for a specific purpose, are bunched and the total amount of these checks subtracted from the depositor's balance at one time. In this case the operator sets up the number of checks in the bunch on the item counting keys and enters this total amount in item counting wheels. Ordinarily, however, only one debit item is subtracted from the depositor's balance at a time, and in this case the item counting mechanism functions automatically to count one each time a debit item is subtracted from the balance. Before the automatic item accumulating mechanism will function, it is necessary that the traveling carriage be tabulated to a subtract column, and that one or more of the amount keys 71 be depressed. A control key is provided for rendering the check counting device inactive in subtract operations, in case it is desirable not to have certain items counted. The control key also causes a symbol to be printed opposite the item to indicate that said item was not counted.

*Item counting keys*

As previously explained, there are three denominational rows of check or item counting keys 82 (Fig. 1). A cross sectional view of the second row of these keys is shown in Figs. 5 and 6, and mechanism which is comon to all three rows of item counting keys will be explained in connection with these figures.

The upper ends of the stems of the item counting keys extend through the keyboard plate 69 while fast in the lower end of each of said key stems is a square stud 269 which protrudes through a corresponding vertical slot in one of the partition plates 270 similar to the amount partition plate 70 and forming a part of the keyboard framework. A bar 271, which is connected to the plate 270 by screws, overlies the lower ends of the stems of the keys 72 to retain the studs 269 in their respective slots. A coil spring 272 is threaded between stationary studs 274 in the plate 270 and pins 273, one of the latter of which is carried by each of the keys 72 and the spring 272 provides a means of returning the keys upwardly to undepressed position. Each of the pins 273 cooperates with a corresponding camming surface in an opening in a control plate 275 and its corresponding camming surface on the nose of a hook in a locking detent 276, similar in every respect to the amount control plate 155 (Fig. 3) and the amount locking detent 154. The plate 275 and the detent 276 are mounted for horizontal sliding movement by means of rollers turnably mounted upon four studs 277 secured in the partition plate 270 and retained in place by means of spring clips assembled in annular grooves in each of the studs 277. A spring 278 stretched between the plate 275 and the detent 276 urges them rearwardly and forwardly respectively to normally maintain the camming surfaces thereon in contact with the pins 273 in the keys 72.

Depressing an item counting key 72, in any one of the three rows, causes the pin 273 in said key in cooperation with the corresponding camming surface on the control plate 275 to shift said control plate forwardly against the action of the spring 278 (Fig. 5) to move the zero latch for the main actuator for that particular row of keys to ineffective position in a manner to be fully explained later. Also upon depression of an item counting key the pin 273, in cooperation with the angular surface on the nose of the corresponding hook for that key, shifts the locking detent 276 rearwardly against the action of the spring 278 until said pin 273 moves beyond said hook, whereupon the spring 278 returns the locking detent 276 forwardly to latch the hook over the pin 273 to retain the key 72 depressed.

The right-hand end of the detent 276, as observed in Fig. 5, cooperates with the rod 249 in exactly the same manner as the amount detent 154 (Fig. 3) to prevent release of the machine when one of the item counting keys is partially depressed.

The units row or row one of the item counting keys has a main actuator 279, (Figs. 7 and 16) the tens row or row 2 (Figs. 5, 7, 12 and 17) has a main actuator 280 and an auxiliary actuator 281, and the hundreds row or row 3 (Figs. 7, 13 and 18) has a main actuator 282 and an associated auxiliary actuator 283. Taking the main actuator 280 (Fig. 5) as representative of all the main actuators for the item counting banks, these actuators are mounted for horizontal sliding movement upon the rod 167 and the bar 168 in exactly the same manner as the amount actuator 166 (Fig. 3). Each of the main actuators 279, 280, and 282, has therein a vertical slot 284 which embraces a stud 285, in a downward extension of a reducer segment 286 rotatably mounted upon the shaft 172. A link 287 connects a rearward extension of the segment 286 to a type sector 288 similar in every respect to the amount type sector 68 (Fig. 3). A spring 289 normally maintains a beak 290 of the segment 286 in contact with the bail 174 of the leading frame.

The main item counting actuators 279, 280 and 282, (Figs. 5 and 7) have teeth on the rearward ends thereof which cooperate respectively with item counting wheels 291, 292 and 293, mounted upon the #1 or balance totalizer shaft. Each of the item counting wheels has integral therewith a tripping cam 294 having diametrically opposed tripping teeth which cooperate with their respective add tripping pawls 295 and subtract tripping pawls 296. In the present embodiment, items are counted only in subtract operations, therefore the add tripping pawls 295 serve only to stop the item counting wheels in zero position in sub-total and total operations. In the beginning of subtract operations the add pawls 295 are shifted out of the path of the teeth in the tripping cams 294 and the subtract pawls 296 are shifted into the path of said teeth. In sub-total and total operations, the add pawls 295 are returned into the path of the tripping cams 294.

The auxiliary actuators 281 and 283 (Figs. 5 and 7) are slidably mounted adjacent their respective main actuators 280 and 282 in slots in the rod 167 and by means of horizontal slots 297 in the right-hand end of said auxiliary actuators, as here viewed, in cooperation with a stud 298 secured in each of the main actuators. The auxiliary actuators 281 and 283 carry respectively latch arms 299 and 300, (Figs. 5, 12 and 13) carrying studs 301 and 302 adapted to engage notches in blocks 303 and 304 secured respectively to the main actuators 280 and 282. Springs 305 urge the latch arms 299 and 300 clockwise to engage the studs 301 and 302 with the notches in the blocks 303 and 304, when the restraining means is removed from said arms 299 and 300.

Referring to Figs. 16, 17, and 18, the main actuators 279, 280 and 282 have secured thereto respectively blocks 306, 307 and 308, and the auxiliary racks 281 and 283, (Figs. 12 and 13) have secured thereto similar blocks 309 and 315. The block 306 on the main actuator 279 (Fig. 16) has cooperating therewith two zero latches 316 and 317 loose on the shaft 159, which are adapted to latch the main actuator 279 in zero position under certain conditions to be revealed later. The block 307 (Fig. 17) on the main actuator 280, has cooperating therewith two zero latches 318 and 319 loose on the shaft 159 and the main actuator 282, (Fig. 18) has cooperating with the block 308 assembled thereon a zero latch 320. The block 309 (Fig. 12) on the auxiliary actuator 281 has cooperating therewith two zero latches 321 and 322 loose on the shaft 159 and the block 315 for the auxiliary actuator 283 (Fig. 13) has cooperating therewith zero latches 323 and 324, rotatable on the shaft 159.

*Carriage control of item counting device*

As previously stated, before the item counting mechanism can function automatically, it is necessary that the traveling carriage be tabulated to a subtract column, and that one or more amount keys be depressed. Directing attention to Figs. 7, 19, 20 and 21, when the machine is at rest, an extension 325 of a yoke 326 is positioned so that it is in the path of shoulders 314 on the forward ends of the main and auxiliary item counting actuators to retain said actuators in zero positions. A downward extension 327 of the yoke 326 has pivotally connected thereto the forward end of a pitman 328, the other end of which is bifurcated to straddle a collar on the shaft 162. A spring 329, one end of which is connected to the extension 327, urges the yoke 326 counter-clockwise and the pitman 328 rearwardly to normally maintain a stud 330 carried by said pitman in contact with a downward extension 331 of the arm 196 (see also Fig. 5).

Initial movement counter-clockwise of the main shaft 78 and the arm 196 retracts the extension 331 from the stud 330. This permits the spring 329 to shift the pitman rearwardly and rock the extension 325 of the yoke 326 downwardly out of the path of the shoulders 314, unless such rearward movement of the pitman 328 is obstructed by means of a bent-over ear 332 thereon, in cooperation with the end 333 of an arm 334 loose on a shaft 335 journaled in the frames 60 and 61. An upward extension 336 of the arm 334 carries a stud 337 embraced by the bifurcated end of a link 338, the other end of which is pivoted to a downward extension of a control lever 340, loose on a stud 341 in the left frame 61. An extension 342 of the lever 340 has connected thereto the lower end of a hanging bar 343, the upper end of which is connected to one end of the hanging bar lever 194.

Tabulating the traveling carriage 66 (Figs. 3 and 20) to a subtract column causes a lug 344 on the subtract tappet 192 to engage the upturned end of the lever 194 and rock said lever clockwise, to lift the hanging bar 343 and rock the lever 340 counter-clockwise, as viewed in Fig. 19. Counter-clockwise movement of the lever 340 causes a bent-over extension 418 on the upper end thereof, in cooperation with a stud 419 carried by a lever 420, to rock said lever also counter-clockwise upon its pivot stud 421, secured in the left frame 61. Counter-clockwise movement of the lever 420 causes a stud 422 in the hook-shaped lower end thereof, in cooperation with an angular camming surface on a totalizer engaging lever 423, to rock said lever 423 counter-clockwise upon a stud 424 secured in the left frame 61. Counter-clockwise movement of the engaging lever 423 moves the ends of spring-pulled engaging and disengaging pawls 425 and 426 into the path of the lower end of a flying lever 427 pivoted at 428 to a totalizer engaging plate 429 secured on the main shaft 78.

Initial movement counter-clockwise of the main shaft 78 (Fig. 19) and the plate 429 causes the lower end of the flying lever 427 to engage the end of the pawl 425 to shift a link 430, connecting the upper end of said flying lever 427 to a crank 431 secured on a #1 totalizer engaging shaft 432, forwardly to rock the crank 431 and the shaft 432 clockwise to engage the wheels of the #1 or balance totalizer (Fig. 3) with the amount actuators 166 prior to their initial movement rearwardly, and to engage the wheels 291, 292 and 293 (Fig. 7) of the item counting totalizer with their respective main actuators 279, 280, and 282 prior to their initial movement rearwardly. Initial movement rearwardly of the actuators reversely rotates the wheels of the balance totalizer to subtract the amount set up on the amount keys therefrom and also reversely rotates the wheels of the item-counting totalizer to subtract the complement of the amount of the item therefrom. After the actuators have completed their initial movement rearwardly, return movement clockwise of the main shaft 78 (Fig. 19) and the plate 429 causes the lower end of the flying lever 427, which, during the initial movement of said shaft 78 and said plate 429, by-passes the upper end of the pawl 426, to engage said pawl to shift the link 430 rearwardly to rock the crank 431 and the #1 totalizer engaging shaft 432 counter-clockwise to disengage the wheels of the balance totalizer and the item counting wheels from the actuators.

Depressing the subtract key 73 selects and conditions the balance totalizer for a subtract operation and in addition prevents the item counting device from functioning automatically at this time.

Depressing the subtract key 73 (Fig. 19) moves a notch 433 therein opposite a bent-over ear 434 on a lever 435 pivoted on the stud 421. This permits a spring 436 to urge the lever 435 counter-clockwise to cause a projection on the lower end thereof, in cooperation with a stud 437 in the lever 420, to rock said lever counter-clockwise to select and condition the balance totalizer for a subtract operation, in the manner explained above. Prior to the end of a subtract operation the lever 435 is rocked clockwise, in the well known manner described in the above-mentioned Patents Nos. 1,819,084 and 1,197,278, to move the ear 434 out of engagement with the slot 433 to permit the subtract key 73 to be spring-returned upwardly, after which the ear 434 comes to rest on the edge of the key 73, as here shown.

Counter-clockwise movement of the lever 340, (Figs. 19, 20 and 21), when the traveling carriage is tabulated to a subtract column, shifts the link 338 rearwardly to rock the arm 334 clockwise against the tension of a spring 417, to move the end 333 thereof out of the path of the ear 332 to permit rearward movement of the pitman 328 and counter-clockwise movement of the yoke 326 to ineffective position upon initial movement of the main shaft 78 and the arm 196. How the subtract key disables the automatic counting of items will be explained later. It is therefore obvious from the foregoing description that it is necessary for the balance totalizer to be selected and conditioned for a subtracting operation by the carriage before the item counting actuators are free to move out of zero positions.

*Automatic accumulation of items*

Each time a debit item is subtracted from the balance totalizer, one is entered in the item totalizer. Depressing an amount key 71 in any order releases the three main actuators 279, 280 and 282 (Fig. 7) for full movement to subtract the complement of one (999) from the item counter.

Each of the zero latches 158 (Figs. 3 and 15) for the several amount banks, has a hook 345 which underlies a rod 346, which extends the full width of the keyboard and is supported by similar arms 347 secured on the shaft 159. Depressing one of the amount keys 71 shifts the associated control plate 155 forwardly to rock the latch 158 counter-clockwise to lift the rod 346. It will be noted by referring to Figs. 15, 16, 17, and 18, that the rod 346 underlies shoulders on the zero latches 317, 319 and 320 for the main actuators 279, 280 and 282. It is therefore obvious that upward movement of the rod 346, when an amount key is depressed, rocks the pawls 317, 319 and 320 counter-clockwise against the action of springs 348, which normally maintain said pawls in engagement with the blocks 306, 307 and 308 on the main actuators, upwardly out of engagement with said blocks. The latches 316 and 318 for the main actuators 279 and 280 are yieldingly retained in ineffective position, as shown in Figs. 16 and 17, by a spring 313 (Fig. 16) which is coiled about the shaft 372, one end of said spring being formed to engage the downwardly projecting arm of the bell crank 370, as shown in Fig. 16, and the other end of said spring projecting upward to engage on the upper edge of the projection 364 of the partition plate 70 for the highest order amount bank, which projection is shown in the lower left-hand corner of Fig. 4, as supporting shaft 372. The spring is thus normally under tension, so as to yieldingly hold the latches 316 and 318 in normal ineffective position when the item counting mechanism functions automatically. Consequently the main actuators are free to move full distance rearwardly to ninth position under influence of the leading frame bail 174 (Fig. 5), in which position they are stopped by means of the shoulders 314 contacting the rod 167.

When items are counted automatically the auxiliary actuators 281 and 283 of rows 2 and 3, respectively (Figs. 12 and 13) remain latched in zero positions, as here shown because when no item counting keys are depressed both the latches 321 and 322, for the auxiliary actuator 281 of row 2, and the latches 323 and 324, for the auxiliary actuator 283 of row 3, remain latched over the blocks 309 and 315, as here shown. The latches 321, 322, 323 and 324, for the auxiliary actuators are spring-urged clockwise to effective positions by springs 324.

The latches 321 and 322 (Fig. 12) have angular noses, which cooperate with a corresponding angular surface on the end of the arm 299, and the latches 323 and 324 (Fig. 13) have similar angular noses which cooperate with a corresponding angular surface on the end of the arm 300. When either of the latches 321 or 322 is in effective position, as here shown, the spring tension thereon is sufficient to overcome the action of the spring 305 and retain the stud 301 out of engagement with the notch in the block 303, and the same is true of the latches 323 and 324 for the auxiliary actuator 283, and in such cases the auxiliary actuators remain uncoupled from their corresponding main actuators.

In subtract operations the wheels of the balance totalizer and the item counting wheels are engaged with their respective actuators, prior to initial movement of said actuators, which movement reversely rotates the amount wheels to subtract therefrom the amount set up on the keyboard, and reversely rotates the item counting wheels to subtract therefrom 999, which is the complement of "one," when there are three denominational orders. Since there are only three denominational orders of counter wheels, the result is to bring the counter pinions to positions like those they would have occupied if one unit had been added into the counter wheel 291 (Fig. 7). Prior to return movement forwardly of the main item counting actuators and the amount actuators, the item counting wheels and the wheels of the balance totalizer are disengaged therefrom.

*Disabling of automatic item counting mechanism*

Sometimes it is desirable not to have an item automatically counted, and the automatic item-counting mechanism may be disabled or rendered inoperative by depressing the "Subtract" key 73 (Fig. 19). Depressing the "Subtract" key 73 causes the lower end thereof to engage the camming surface of a projection 349 of a slide 350, mounted on the left frame 61 by means of two horizontal slots therein, in cooperation with studs 360 secured in the frame 61, to shift said slide 350 forwardly. A link 351 pivotally connects the slide 350 to a crank 352, secured on the shaft 335, and rocks said crank and said shaft clockwise when the slide 350 is shifted forwardly by depression of the subtract key.

Clockwise movement of the shaft 335 rocks an arcuate surface 353 on an arm 354, secured on said shaft, into the path of the bent-over ear 332 on the link 328 to retain the extension 325 of the yoke 326 in the path of the shoulders 314 to obstruct movement of the item counting actuators, to prevent the item-counting mechanism from functioning automatically, even though the traveling carriage is tabulated to a subtract column. Normally the surface 353 of the arm 354 is below the ear 332 and does not obstruct movement of the pitman 328 upon operation of the machine. In addition to controlling the item-counting mechanism, the slide 350 is also arranged to position a symbol type carrier, in the manner shown and described in the above-mentioned Ens patent. Consequently depression of the "Subtract" key causes a symbol to be printed opposite the debit item to show that said item was not counted.

Other control keys, including the "Non-add" key, the "Total check" key, and the "Total deposit" key, also position the slide 350 to cause a symbol to be printed characteristic of the different operations these keys initiate. Positioning of the slide 350 by the keys mentioned above, also rocks the arm 354 clockwise (Fig. 19) to move the surface 353 into the path of the ear 332. However, this movement of the arm 354 is incidental to the positioning of the symbol type carrier and is not necessary to prevent automatic operation of the item-counting mechanism at this time, because when these control keys are used, the traveling carriage is not in a subtract column and consequently the arm 334 obstructs movement of the pitman 328 and the extension 325 of the bail 326 to prevent automatic operation of the check counting mechanism.

In balance and sub-balance operations it is desirable that the extension 325 of the yoke 326 be moved to ineffective position so that the item counting actuators are free to be positioned by the item counting wheels, when they are returned to zero, so that said actuators may in turn position their respective type carriers to record the amount standing on the item counting wheels.

Depressing either the "Balance" or the "Sub-balance" key 73 causes the lower end of the stems of said keys, in cooperation with a corresponding camming surface on a projection 355 or a projection 356 of the slide 350, to move said slide forwardly, which by means of the link 351 rocks the shaft 335 and the arm 354 a sufficient distance clockwise (Fig. 19) to move the arcuate surface 353 beyond the ear 332. This clockwise movement of the arm 354 is sufficient to cause a stud 357 (Figs. 19 and 21) therein to engage the lower surface of the arm 334 and rock said arm upwardly out of the path of the ear 332, which is obviously necessary as the traveling carriage is not in a subtract column when a balance or a sub-balance is being taken. Therefore, when either the "Balance" or the "Sub-balance" key 73 is depressed the pitman 328 moves rearwardly under influence of the arm 196 upon initial movement counter-clockwise of the shaft 78 to rock the extension 325 out of the path of the shoulders 314 on the item counting actuators to cause the total to be taken from the item counting wheels and recorded.

*Use of item counting keys*

When using the item counting keys 72 (Figs. 1 and 5) for entering more than one item in the wheels of the item counter it is necessary to have the traveling carriage tabulated to a subtract column, the same as when items are automatically entered in the item counting wheels, however, it is not necessary that an amount key be depressed. There are seven problems presented in the use of the item counting keys and it is believed that the best way to explain this mechanism is to treat each problem separately.

EXAMPLE 1.—*Item key depressed in row 1*

When a key is depressed in the units row, or row 1, of the item counting device, it is necessary that the main actuator for this row go to the complement of the number, and for the main actuators of row 2 and row 3 to go to 9. For example, if the 4 key (Figs. 1, 15 and 16) is depressed in row 1 the actuator 279 for row 1, under influence of the leading frame bail 174, moves to its sixth position, in which position it is located by means of a corresponding one of a series of graduated steps 358 on the top edge thereof coming in contact with the stud 269 in the depressed key. This movement of the actuators 279 rotates the units item counting wheel 291 (Fig. 7) reversely six steps, which positions the units item counting wheel into the position it would have occupied if 4 had been added.

Depressing the 4 key in the first row releases the main actuators for rows 2 and 3, and as there are no keys depressed in these rows, the actuators for rows 2 and 3 travel full distance to ninth position. The three actuators therefore move to subtract the complement 996 from the item counting wheels, which, assuming that the wheels were in zero position at the beginning of the operation, leaves the units wheel standing at 4, and the tens and hundreds wheels standing at zero. The latch 321 (Figs. 12, 15, and 16) is yoked to a hook-shaped extension 359, which underlies the rod 346, and an upward extension 365 of said latch is adapted to cooperate with the control plate 275 for the first row of item counting keys in exactly the same manner as the amount latch 158 explained earlier herein.

Depressing a key in row 1 shifts the control plate 275 forwardly to rock the latch 321 counter-clockwise to cause the hook 359 to shift the rod 346 to move the latches 317, 319 and 320 (Figs. 16, 17, and 18) for the main actuators 279, 280 and 282 to ineffective positions. The zero latch 321 (Fig. 12) for the auxiliary actuator 281 is rocked to ineffective position, however, the latch 322 remains effective, and holds said actuator in zero position. The latches 323 and 324 for the auxiliary actuator 283 (Fig. 13) remain effective to retain said actuator in zero position. The latches 316 and 318 for the main actuators 279 and 280 remain in ineffective positions as here shown. It is therefore evident that the main actuator for row 1 is free to move until it is positioned by the stud 269 (Fig. 5) in the depressed key, and the main actuators for rows 2 and 3 are free to move the full distance to ninth position to subtract the complement of the amount set up in row 1 from the wheels of the item counting device.

EXAMPLE 2.—*Item key depressed in row 2*

When a key is depressed in row 2 of the item counting device, for example, the 4 key, it is necessary to subtract the complement of 40 (960) from the three wheels of the item counting device. This is accomplished by retaining the main actuator for row 1 in zero position and by allowing the main actuator for row 2 to move to sixth position, in which position it is stopped by the stud in the depressed key in cooperation with the corresponding step 358 thereon, and by permitting the main actuator for row 3 to go to ninth position. As before, the auxiliary actuators are retained in zero positions.

The latch 322 (Figs. 15 and 17) is yoked to a hook-shaped extension 366, which underlies the rod 346, and has an upward extension 367 which cooperates with the control plate 275 for row 2. Depressing a key in a row 2 shifts the control plate 275 forwardly to rock the latch 322 counter-clockwise to cause the extension 366 to lift the rod 346, to rock the latches 317, 319 and 320 for the main actuators 279, 280 and 282 (Figs. 16, 17 and 18) to ineffective positions. The latches 316 and 318 carry studs which extend respectively through slots in the upper ends of links 368 and 369, the lower ends of which are pivotally connected to bell cranks 370 and 371 secured on a shaft 372 rotatably supported by the keyboard framework. Also secured on the shaft 372 is a plurality of arms 373, the upper ends of which support a rod 374, which cooperates with downward projections 375 of the extension 367 of the latch 322, and 376 of an extension 377 of the latch 324. Springs 378 and 379 (Figs. 16 and 17) form flexible connections between the latches 316 and 318 and their respective bell cranks 370 and 371, so that said bell cranks and their associated links may move independently of the latches when said latches are retained in ineffective positions in a manner later to be described.

Counter-clockwise movement of the extension 367 lifts the rod 346 to move the latch 317 to ineffective position. However, the projection 375 of the extension 367 rocks the rod 374, the shaft 372, and the bell cranks 370 and 371 clockwise against the action of the spring 313 (Fig. 16). Clockwise movement of the bell crank 370, by means of the link 368 moves the latch 316 downwardly into engagement with the block 306 to obstruct movement of the main actuator 279. Counter-clockwise movement of the extension 367 (Figs. 15 and 17) moves a stud 380 carried thereby into engagement with the upper end of a slot in the latch 318 to prevent clockwise movement of the latch to effective position under influence of the bell crank 371, the spring 379 forming a flexible connection that permits movement of said bell crank independently of said latch 318. It is, therefore, apparent that when a key is depressed in row 2 the main actuator 279 for row 1 will be retained in zero position, the main actuator 280 for row 2 will be positioned by the depressed key, and the main actuator 282 for row 3 will travel to the 9 position, and the two auxiliary actuators will be retained in zero positions to subtract the complement (960) of the value of the depressed key from the item counting wheels.

EXAMPLE 3.—*Item key depressed in row 3*

When a key is depressed in row 3 it is necessary that the main actuators for rows 1 and 2 be retained in zero positions, the main actuator for row 3 be positioned by the depressed key, and that the two auxiliary actuators for rows 2 and 3 be retained in zero positions. For example, if it is desired to count 400 in the item counting wheels it is necessary to subtract its complement 600 therefrom. Depressing the 4 key in row 3 causes the main actuators for rows 1 and 2 and the auxiliary actuators for rows 2 and 3 to be retained in zero positions, and positions the main actuator for row 3 in sixth position, which revolves the corresponding item counting wheel reversely six steps to fourth position, which has the effect of advancing the hundreds counter wheel four steps.

Depressing a key in row 3 shifts the control plate 275 (Figs. 15 and 18) therefor forwardly to rock the extension 377 and the latch 324 counter-clockwise. Counter-clockwise movement of the extension 377 causes the projection 376 in cooperation with the rod 374 to rock the shaft 372 clockwise, which by means of the bell cranks 370 and 371 (Figs. 16 and 17) and their associated links 368 and 369 rocks the latches 316 and 318 clockwise into engagement with their respective blocks 306 and 307 to retain the main actuators 279 and 280 in zero positions during operation of the machine.

While there is no hook on the extension 377 of the latch 324 to lift the rod 346, this rod is nevertheless lifted by the hook 345 (Fig. 15) on the zero latch 158 for the amount bank in which an amount key is depressed, and rocks the latches 317 and 319 for the main actuators 279 and 280 to ineffective positions; making it necessary to move the latches 316 and 318 to effective positions. The rod 346 (Fig. 18) rocks the latch 320 out of engagement with the block 308 to free the main actuator 282 for row 3. While there is no reason for operating the machine without depressing an amount key, it is possible, and in such a case counter-clockwise movement of the extension 377 (Fig. 18) causes a stud 381 therein, in cooperation with an angular slot in the latch 320, to rock said latch out of engagement with the blocks 308 to free the main actuator 282 for row 3.

The latch 324 (Fig. 13) for the auxiliary actuator 283 is rocked to ineffective position upon depression of a key in row 3. However, the latch 323 remains effective to retain the auxiliary actuator in zero position. Inasmuch as there are no keys depressed in rows 1 and 2, both the latches 321 (Fig. 12) and 322 remain effective to retain the auxiliary actuator 281 for row 2 in zero position. Upon operation of the machine, the main actuator 282 for row 3 is stopped in its initial movement by the stud 269 (Figs. 5 and 6) in the depressed key to position said main actuator to cause the complement (600) of the value of the depressed key to be subtracted from the item counting wheels.

EXAMPLE 4.—*Item keys depressed in rows 1 and 2*

The next problem to be analyzed is the depression of a key in each of rows 1 and 2. Assuming that the 4 key has been depressed in each row, the complement of 44 is 956, and in this case the depressed key in row 1 stops the actuator at sixth position, the complement of 4, the auxiliary actuator for row 2 is coupled to the main actuator, and said auxiliary actuator in cooperation with the depressed 4 key stops the main actuator at 5, and the main actuator for row 3 is allowed to travel full distance to ninth position; thus we obtain the complement (956) of 44.

Depressing an item counting key in row 1, (Figs. 5, 15, 16, 17 and 18) causes the control plate 275 for row 1, to rock the extension 365 counter-clockwise to cause the hook 359 to lift the rod 346 to move the latches 317, 319 and 320 for their respective main actuators 279, 280 and 282 to ineffective positions. Counter-clockwise movement of the extension 365 also rocks the latch 321 (Figs. 12 and 15) for the auxiliary actuator 281 for row 2 to ineffective position.

Depressing a key in row 2 rocks the extension 367 and the latch 322 (Figs. 12, 15 and 17) for the auxiliary actuator 281 to ineffective position. This frees the auxiliary actuator 281 for movement and permits the arm 299 to be impelled clockwise by the spring 305 to engage the stud 301 with the notch in the block 303 to couple the auxiliary actuator 281 to its associated main actuator 280. Counter-clockwise movement of the extension 367 causes the projection 375 to rock the shaft 372 clockwise, which moves the links 368 and 369 downwardly and tensions springs 378 and 379. This tends to move the latches 316 and 318 to effective positions. However, studs 382 and 380, respectively, in the extensions 365 and 367 in cooperation with their respective slots in said latches retain said latches in ineffective positions.

It will be noted by referring to Figs. 5 and 12 that the auxiliary actuator 281 has corresponding graduated steps 383 for each of the graduated steps 358 on the main actuator 280. The graduated steps 383 are one step in advance of the steps 358 and when the auxiliary actuator is coupled to the main actuator the corresponding step 383 in cooperation with the stud 269 (Fig. 5) in the depressed key stops the main actuator 280 one step in advance of the complement of the depressed key, which with the 4 key depressed would be position 5.

Inasmuch as no key is depressed in row 3, the latch 324 remains effective (Figs. 13 and 15) to retain the auxiliary actuator 283 in zero position. The latch 323 for the auxiliary actuator 283 is rocked to ineffective position, however, this is merely incidental to this particular operation and will be explained later in connection with another problem. It is therefore evident that the main actuator for row 1 is positioned by the depressed key in row 1 to the complement thereof, that the main actuator for row 2 is positioned by the auxiliary actuator for row 2 one digit less than the complement of the depressed key and the main actuator for row 3 travels to position 9. Therefore, when 44 is set up on the item counting keys the complement 956 thereof is subtracted from the wheels of the item counting totalizer.

EXAMPLE 5.—*Item keys depressed in rows 2 and 3*

When a key is depressed in each of rows 2 and 3 of the item counting device it is necessary that the main actuator for row 1 be retained in zero position, that the main actuator for row 2 be positioned at the complement of the depressed key, and that the main actuator for row 3 be positioned by the auxiliary actuator at a position corresponding to one digit less than the complement of the depressed key. For example, depressing the 4 key in each of the rows 2 and 3, when it is desired to count 440 items in the item counting wheels, causes the main actuator for row 1 to be retained in zero position, the main actuator for row 2 to be stopped in sixth position, and the main actuator for row 3 to be stopped in fifth position, to cause the complement (560) of 440 to be subtracted from the item counting wheels.

Depressing a key in row 2 shifts the plate 275 (Figs. 12, 15 and 17) forwardly to rock the extension 367 for the latch 322 counter-clockwise to cause the projection 375 thereof, in cooperation with the rod 374 to rock the shaft 372 clockwise, to cause the bell crank 370 (Fig. 16) to rock the latch 316 to effective position to retain the main actuator 279 in zero position. This is necessary in this case because counter-clockwise movement of the extension 367 causes the hook 366 to lift the rod 346 to move the latches 317, 319 and 320, (Figs. 16, 17 and 18) to ineffective positions. The stud 380 in the extension 367 in cooperation with the slot in the latch 318 retains said latch in ineffective position upon clockwise movement of the shaft 372 and the bell crank 371. It is therefore evident that the main actuator for row 2 is free to move to the depressed key.

Depressing a key in row 3 rocks the extension 377 counterclockwise to move the latch 324 (Figs. 13 and 15) for the auxiliary actuator 283 to ineffective position. Counter-clockwise movement of the extension 367, when a key is depressed in row 2, causes an extension 384 thereof in cooperation with a bent-over ear 385 of the latch 323 to rock said latch counter-clockwise to ineffective position to couple the auxiliary actuator 283 to the main actuator 282 in the manner explained for row 2. Depression of a key in row 2 rocks the latch 322 (Figs. 12 and 15) for the auxiliary actuator 281 to ineffective position. However, as no key is depressed in row 1 the latch 321 remains effective and retains said auxiliary actuator 281 in zero position. From the foregoing description it is, therefore, obvious that when 440 is set up on the keyboard of the item counting keys, the complement 560 thereof will be subtracted from the item counting wheels.

EXAMPLE 6.—*Item keys depressed in rows 1 and 3*

The next problem is the depression of a key in rows 1 and 3 of the item counting device.

Assuming that the item counting wheels are standing at zero and that 404 is set up on the item keys, it is necessary that the main actuator for row one reversely rotate the units item wheel six steps to fourth position, the main actuator for row 2 reversely rotate the tens item wheel nine steps to 9 position, and that the main actuator for row 3 be controlled by the auxiliary actuator 282 to reversely rotate the hundreds item wheel five steps to position 5 to subtract the complement (596) of 404 from the item counting wheels.

Depressing a key in row 1 shifts the plate 275 therefor (Figs. 15 and 16) forwardly to rock the extension 365 and the latch 321 counterclockwise, causing the hook 359 to raise the rod 346 to rock the latches 317, 319 and 320 for the main actuators 279, 280 and 282, to ineffective positions. Depressing a key in row 3 shifts the control plate 275 forwardly (Figs. 13, 15 and 18) to rock the extension 377 counter-clockwise to move the latch 324 for the auxiliary actuator 282 to ineffective position. Clockwise movement of the extension 377 also causes the projection 376 thereof to rock the rod 374 and the shaft 372 clockwise, which by means of the bell cranks 370 and 371 (Figs. 16 and 17) ordinarily rocks the latches 316 and 318 for the main actuators 279 and 280 to effective or locking positions. However, movement of the latch 316 to effective position is obstructed by the stud 382 in the extension 365, which is effective when a key is depressed in row 1, and an extension 386, (Figs. 15 and 17) of the extension 365, in cooperation with an upward projection 387 of the latch 318, obstructs movement of said latch 318 to effective position upon clockwise movement of the shaft 372 and the bell crank 371.

Therefore it is apparent that the main actuator 279 for row 1 is free to be positioned by the depressed key in row 1 and the main actuator in row 2 is free to go to ninth position. The latch 321 (Fig. 12) for the auxiliary actuator 281 for row 2 is rocked to ineffective position by the depression of a key in row 1. However, as there is no key depressed in row 2, the latch 322 remains effective to retain the auxiliary actuator 281 in zero position. Depressing a key in row 3 rocks the latch 324 (Fig. 13) for the auxiliary actuator 283 to ineffective position, and depressing a key in row 1 causes the extension 386 in cooperation with the upward projection 385 of the latch 323 to rock said latch to ineffective position to cause the auxiliary actuator 283 to be coupled to the main actuator 282 so that they may move in unison upon operation of the machine. The rod 346 (Fig. 18) has previously moved the latch 320, for the main actuator 282, to ineffective position, therefore the main actuator 282 is free to be positioned by the auxiliary actuator 283 in cooperation with the stud 269 (Fig. 5) in the depressed key in row 3.

Upon operation of the machine, the main actuator 279 for row 1 is positioned by the depressed key and in being positioned reversely rotates the units item counting wheel a sufficient number of steps to subtract the complement (6) of the value of the depressed key therefrom. As there is no key depressed in row 2, the main actuator 280 (Fig. 17) therefor, moves to ninth position, and in so doing reversely rotates the tens item counting wheel nine steps to subtract the complement (9) of one which was borrowed from the tens order from the tens item counting wheel. The auxiliary actuator 283 (Fig. 13) for row 3, positions the main actuator 282 to a position corresponding to one digit less (5) than the complement (6) of the depressed key in row 3, to reversely rotate the hundreds item counting wheel 5 steps to compensate for the digit borrowed from the hundreds order. It is therefore evident that when 404 is set up on the item counting keys the complement 596 thereof will be subtracted from the item counting wheels.

EXAMPLE 7.—*Item keys depressed in rows 1, 2, and 3*

The final example is the depression of a key in each of the three rows of item counting keys. Assuming that 444 has been set up on the item counting keys, it is necessary to subtract the complement 556 thereof from the item counting wheels, to accumulate this amount during a subtract operation. In this case it is necessary that the depressed key in row 1 stop the main actuator in sixth position, that the auxiliary actuator be coupled to the main actuator for row 2, so that the depressed key in row 2 will position the main actuator one digit less than the complement of the depressed key and that the auxiliary actuator and the main actuator for row 3 be coupled together so that the depressed key in row 3 will also position the main actuator one digit less than the complement of the depressed key.

Depressing a key in row 1 shifts the control plate 275 (Figs. 15, 16, 17 and 18) forwardly to rock the extension 365 and the latch 321 counter-clockwise to cause the hook 359 to raise the rod 346 to move the latches 317, 319 and 320 for the main actuators for rows 1, 2 and 3, to ineffective position. It is apparent that counter-clockwise movement of the extension 365 by means of the stud 382 would also rock the latch 317 to ineffective position. Counter-clockwise movement of the extension 365 by means of the extension 386 thereof, in cooperation with the projection 387, rocks the latch 318 for the main actuator 280 to ineffective position and by means of the projection 385 rocks the latch 323 (Figs. 13 and 15) for the auxiliary actuator 283 for row 3, to ineffective position.

Depression of a key in row 2 shifts the control plate 275 therefor forwardly to rock the extension 367 and the latch 322 counter-clockwise. Counter-clockwise movement of the extension 367 (Figs. 15 and 17) by means of the projection 375 in cooperation with the bar 374 rocks the shaft 372, the bell cranks 370 and 371 counter-clockwise to move the latches 316 and 318 for the main actuators 279 and 280 to effective positions in the manner explained earlier herein. However, the depressed keys in row 1 and row 2, in cooperation with their respective plates 275, retain the extensions 365 and 367 in their counter-clockwise positions, causing the studs 382 and 380 (Figs. 16 and 17), in cooperation with the slots in the latches 316 and 318, to retain said latches in ineffective positions, as here shown. It is therefore evident that the main actuators for rows 1 and 2 are free to move under influence of the leading frame 174, upon operation of the machine.

The latch 321 (Figs. 12 and 13) is rocked to ineffective position upon depression of a key in row one, and depression of a key in row 2 rocks the latch 322 also to ineffective position. It is therefore apparent that the arm 299 is free to move clockwise to engage the stud 301 with the notch in the block 303 to couple the auxiliary actuator 281 to the main actuator 280 for row 2. Upon operation of the machine, the leading frame will permit the auxiliary and the main actuators for row 2, to move until the step on the auxiliary actuator corresponding to the depressed key positions the main actuator one digit less than the complement of said depressed key.

Depressing a key in row 3 (Figs. 13, 15 and 18) shifts the control plate 275 forwardly to rock the extension 377 and the latch 324 connected thereto counter-clockwise to ineffective position. It will be recalled that the latch 323 for the auxiliary actuator 283 has previously been moved counter-clockwise to ineffective position by the extension 386 of the latch 321. This permits the arm 300 to be spring-impelled upwardly to engage the stud 302 with the notch in the block 304 to couple the auxiliary actuator 283 to the main actuator 282. It will also be remembered that upward movement of the rod 346 rocks the latch 320 for the main actuator 282 to ineffective position. Likewise in this case the stud 381 in the extension 377, in cooperation with the slot in said latch 320, would also rock said latch to ineffective position. It is, therefore, evident that the main and auxiliary actuators for row 3 are free to move under influence of the leading frame, upon operation of the machine, until the step on the auxiliary actuator corresponding to the depressed key positions the main actuator 282 one digit less than the complement of the depressed key.

Therefore, when 444 is set up on the item counting keys the complement 556 thereof will be subtracted from the item counting wheels, the result being equivalent to adding 444 therein.

At the end of each machine operation counter-clockwise movement of the key release shaft 219 (Figs. 5 and 8) rocks an arm 388 for each of the item counting banks, secured on said shaft 219 counter-clockwise in unison therewith. This causes a stud 389 carried by said arms 388, in cooperation with an angular camming surface on a projection 390 of each of the detents 276 for the item counting banks, to shift said detents rearwardly to disengage the hooks therein from the studs 273 in the depressed item-counting keys to permit said keys to be returned upwardly to normal position by the spring 272 (Fig. 6). At the beginning of a machine operation, counter-clockwise movement of the shaft 203 (Figs. 5 and 9) rocks a lug 391 for each of the item counting banks, and integral with said shaft 203, into the path of a projection 392 on each of the locking detents 276 for the item counting banks, to lock the item counting keys against release or depression.

The seven examples outlined above cover all the combinations of depressed item-counting keys necessary to understand the invention, and it is believed that an understanding of the operation of the item-counting device will have been obtained from a perusal of the foregoing specification.

ITEM TOTAL OPERATIONS

In balance operations, during which the balance totalizer is cleared and the new balance printed in the "Balance" column of a ledger sheet 410 (Fig. 2), the item counter is also cleared and the total number of items is printed in the "Total items" column of the ledger sheet. In all other operations the item printing sectors 288 (Fig. 5) are held against printing movement to prevent unnecessary printing and in subtract operation to prevent erroneous printing, as it will be recalled that the main actuators and their associated printing sectors, for the item counting device, when controlled by the item keys, are always positioned to the complement of the value of the depressed item keys. Also when items are accumulated automatically the main actuators and printing sectors are positioned to the complement of one.

When the traveling carriage 66 (Figs. 3 and 5) is tabulated to other than the Balance column an extension 438 on each of the tappets 192 engages a bent over ear 439 on an extension of an arm 440 connected by a cross bar 441 to an arm (not shown) similar to the arm 440. This rocks the arms 440 and the bar 441 counter-clockwise against the tension of a spring 442 to move said bar 441 into the path of a projection 443 on each of the three arms that support the three item printing sectors 288 to obstruct printing movement of said arms and said sectors.

The stop bar 193 carries a stop 444 which arrests the carriage so that the "Balance" column on the ledger sheet 410 is opposite the type sectors. It will be noted that the stop 444 has no extension to cooperate with the ear 439 and consequently the spring 442 retains the bar 441 out of the path of the projections 443 to allow printing movement of the sectors 288.

As previously explained, the mechanism pictured in Fig. 8 rocks the shaft 219 counter-clockwise in the beginning of total and sub-total operations to release any depressed amount keys and to move the zero latches for the amount banks to ineffective positions. This counter-clockwise movement of the key release shaft 219 in the beginning of balance or total operations causes the stud 389 (Fig. 5) in the arm 388, in cooperation with the angular camming surface on a projection 393 on the item control plate 275 (see also Fig. 15), to shift said plate forwardly to rock the extensions 365, 367 and 377 counter-clockwise, the same as if a key were depressed in each of the item counting rows. Simultaneously the amount zero latches 158 (Figs 3 and 15) are rocked counter-clockwise to ineffective positions, and this movement of the latches 158 and the extensions 365, 367 and 377 rocks the rod 346 upwardly to move the latches 317, 319 and 320 (Figs. 16, 17 and 18) for the main actuators 279, 280 and 282 to ineffective positions.

Counter-clockwise movement of the extensions 365, 367 and 377, causes the studs 382, 380 and 381 therein, in cooperation with slots in the latches 316, 318 and 320, to retain the latches 316 and 318 in ineffective positions, when the shaft 372 is rocked clockwise by the projections 375 and 376 on the extensions 367 and 377, as explained earlier herein, and in cooperation with the rod 346 to rock the latch 320 for the main actuator 282 to ineffective position. The three main actuators for the item counting keys are now free to move under influence of the leading frame 174 (Fig. 5). In total operations the auxiliary actuators 281 and 283 (Figs. 12 and 13) are coupled to their associated main actuators and travel in unison therewith, however, this has no influence upon the positioning of said main actuators, as they are positioned by their corresponding item-counting wheels.

In balance operations the wheels 291, 292 and 293 (Fig. 7) for the item counting device are engaged with their respective main actuators 279, 280 and 282, prior to their initial movement rearwardly, which movement reversely rotates said wheels until one of the two diametrically opposed tripping teeth on the tripping cams 294 (Fig. 5) engages the teeth of the tripping pawls 295 to locate said wheels in zero positions. This positions the main actuators of the item counting device commensurate with the amount on the item counting wheels, and the main actuators in turn position the printing sectors 288 so that when the printer mechanism functions the total number of items will be printed in the "Total Item" column on the ledger sheet 410 (Fig. 2). Prior to return movement forwardly of the main actuators 279, 280 and 282 the item counting wheels are disengaged therefrom, so that said wheels will remain in a cleared state after the completion of the balance operation.

*Item counting mechanism in overdraft operations*

In overdraft operations the complementary amount of the overdraft standing on the balance totalizer is transposed to a true negative balance and this true negative balance is cleared from the balance totalizer and simultaneously printed in the "Balance" column of the ledger sheet. Overdraft operations require three cycles of movement of the machine mechanism. In the first cycle of an overdraft operation the complementary amount of the overdraft is cleared from the balance totalizer and simultaneously entered in an auxiliary storage device. In the second cycle of an overdraft operation the complementary amount of the overdraft is subtracted from the cleared balance totalizer, thus leaving the true negative balance entered in said totalizer, and in the third cycle of an overdraft operation the balance totalizer is again cleared and the true negative balance printed in the "Balance" column of the ledger sheet. It will be recalled that the printer mechanism is disabled during the first two cycles of an overdraft operation to prevent the complementary amount of the overdraft from being printed on the ledger sheet. Therefore in order to have the total number of items recorded in balance operations it is necessary to lock the main actuators for the item counting device in zero positions during the first and second cycles of an overdraft operation, so that the total of the items will not be cleared out of the item counter prior to the printing cycle of an overdraft operation.

Referring to Figs. 7 and 7A, integral with the cluster of cams, including the cam 134 loosely mounted on the stud 86, is a cam 394, the periphery of which cooperates with a roller 395 on a lever 396 rotatably supported by the stud 95. A link 397 connects the lever 396 to a crank 398 secured on a shaft 399 journaled in the frames 60 and 61. Secured on the lefthand end of the shaft 399 is an arm 400, carrying a stud 401 which extends through a camming slot 402 in a lever 403 pivoted on a stud 404 in the left frame 61. The lower end of the lever 403 coopeartes with a stud 405 fast in the slide 350.

Depressing the "Overdraft" key 77 (Fig. 14) causes the pawl 135 in cooperation with the ratchet 137 to rotate the cluster of cams, including the cam 394 (Fig. 7) a slight distance counterclockwise to move the higher portion of said cam out of the path of the roller 395 to permit a spring 406 to rock the shaft 399 and the arm 400 clockwise. Clockwise movement of the arm 400 (Fig. 7A) causes the stud 401, in cooperation with the camming slot 402, to rock the lever 403 clockwise, which movement, by means of the stud 405, shifts the slide 350 forwardly. Forward movement of the slide 350, by means of the link 351 (Figs. 19 and 21), rocks the surface 353 of the arm 354 beyond the bent-over ear 332 on the pitman 328, and the stud 357 carries the arm 334 out of the path of the ear 332. Ordinarily this permits the extension 325 of the yoke 326 to move out of the path of the shoulders 314 on the main actuators for the item counting device, upon initial movement counterclockwise of the shaft 78 and the arm 196. However, the extension 325 is retained in effective position, as here shown, by mechanism now to be described, and effective only in overdraft operations.

It will be recalled by referring to Figs. 7, 14 and 20 that depressing the "Overdraft" key 77 by means of the pawl 135, rocks the high portion of the cam 134 out of the path of the roller 133 to release the lever 131 to the action of the spring 136, which immediately rocks said lever clockwise as here viewed. Clockwise movement of the lever 131 by means of a link 407, connecting said lever to one arm of a yoke 408 loose on a rod 409 supported by the frames 60 and 61, rocks said yoke counter-clockwise. Counter-clockwise movement of the yoke 408 rocks an arcuate projection 415 of the lefthand arm thereof underneath a protruding ear 416 of the extension 325 of the yoke 326. This obstructs movement of the yoke 326 (Fig. 19) to ineffective position when the arm 196 is retracted from the stud 330 and causes the extension 325 in cooperation with the shoulders 314 on the main actuators 279, 280 and 282 to retain said actuators in zero position.

Near the end of the second cycle of an overdraft operation the high portion of the periphery of the cam 134 (Fig. 14) rocks the lever 131 counter-clockwise, which by means of the link 407 rocks the yoke 408 clockwise to move the projection 415 out of the path of the ear 416 to permit the main actuators and the printing mechanism for the item counting device to be positioned by the item counting wheels in the last or printing cycle of an overdraft operation so that the total number of items will be recorded in the "Total items" column of the ledger sheet. In other than overdraft operations, the projection 415 remains in the path of a recess in yoke 326 and out of the path of the ear 416, as shown in Fig. 20 and consequently does not interfere with the movement of the yoke 326.

Mode of operation

It is believed that an understanding of the mode of operation of the present machine will have been obtained from a perusal of the specifications. However, a brief description of the sequence of operations in connection with the ledger sheet 410 shown in Fig. 2 will be given.

The ledger sheet 410 is typical of that used by banks for balancing individual checking accounts, and the general practice is to balance each account daily. The previous balance of $1000.00 was picked up from the previous ledger sheet, added into the balance totalizer and simultaneously printed at the head of the "Deposit" column. On February 14, 1935, three single items or checks of $100.00 each were subtracted from the depositor's account, and during the subtraction of these items one was automatically counted in the wheels of the item counting totalizer for each item subtracted. On this date this depositor's account was credited with a $250.00 deposit, leaving a balance of $950.00, which was printed in the "Balance" column of the ledger sheet 410 in a balance operation. During this balancing operation the item counter was cleared and the total number of items (three) printed in the "Total item" column of the ledger sheet.

On February 15, 1935, the old balance of $950.00 was set up on the keyboard and entered into the balance totalizer, and thereafter three debit items, one for $350.00 and two for $100.00 each, were subtracted from the depositor's account. The first and third of these items were automatically counted by the item counting device, but in this case it was not desired to count the second item, and depressing the "Subtract" key 73, by means of the mechanism pictured in Fig. 19, locked the main actuators for the item counting device in zero positions during this operation, and caused the symbol "N. C." (non-count) to be printed opposite the second item as shown in the above-mentioned Ens patent. There were no deposits on this date, and in a final balance operation the balance of $400.00 was printed in the "Balance" column of the ledger sheet and the total number of items (two) was printed in the "Total items" column of the ledger sheet.

On February 16, 1935, a bundle of debit items, totaling $500.00, was deducted from the depositor's account. This bundle contained 25 items and this amount was set up on the keys of the item counting device and counted in the item counting totalizer simultaneously with the deduction of the $500.00 from the balance totalizer. In this case there were no deposits and the traveling carriage was skip-tabulated directly from the "Check" column to the "Balance" column. The automatic locking of the "Balance" key notified the operator that the balance totalizer had been overdrawn, and depressing the "Overdraft" key 77 (Fig. 1) caused the machine to operate through three cycles to transpose the complementary amount of the overdraft to a true negative balance, and in the third or final cycle of an overdraft operation to print this balance and the total number of items in the bundle (25) in their respective columns.

On February 20 there were no debit items to be subtracted from the depositor's account, and in such a case nothing would be counted in the item counting totalizer. However, there was a deposit of $125.00, which leaves a positive balance of $25.00. The only time the previous balance is printed upon the ledger sheet is when a new sheet is started. At other times the previous balance is picked up from the "Balance" column of the ledger sheet and printed on the edge of the journal sheet, which extends beyond the left end of the ledger sheet.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a totalizer line; a balance totalizer on the line; means to select and condition said balance totalizer for subtract operations; another totalizer on the line, having three denominational orders; an actuator for each order; a latch for each actuator to retain said actuators in a neutral position; another means to retain the actuators in their neutral positions; keys to set up amounts to be subtracted from the balance totalizer; means operated by the depression of an amount key to move the latches to ineffective position; means rendered effective by the selecting and conditioning means when the balance totalizer is selected for a subtract operation to render the other retaining means ineffective thereby freeing the actuators; and means to differentially arrest the actuators to cause an amount to be counted in the other totalizer by subtracting the complement of said amount therefrom.

2. In a machine of the class described, the combination of a totalizer; actuators for the totalizer; means to select and condition the totalizer for subtract operations; means to retain the actuators in a neutral position; means to move the retaining means to ineffective position each machine operation; normally effective means to block movement of the retaining means to ineffective position; and means operated by the selecting and conditioning means to move the blocking means to ineffective position.

3. In a machine of the class described, the combination of a totalizer; actuators for the totalizer; means to select and condition the totalizer for subtract operations; means to retain the actuators in a neutral position; means to move the retaining means to ineffective position each machine operation; normally effective means to block movement of the retaining means to ineffective position; normally ineffective means to block movement of the retaining means to ineffective position; means operated by the selecting and conditioning means to move the first blocking means to ineffective position; and means including a depressible key and parts operated thereby to move the second blocking means to effective position to supersede the action of the first blocking means.

4. In a calculating machine, the combination of a totalizer line; a balance totalizer on the line; an item totalizer on the line; a set of actuators for each of the totalizers; means to cause the totalizers to be engaged with and disengaged from their respective actuators in subtract time; means to move the actuators; means to control the differential movement of the actuators for the item totalizer so that they move an extent equal to the complement of an amount to cause the complement of said amount to be subtracted to obtain the effect simultaneous subtraction and addition in the two totalizers; means to retain the actuators for the item totalizer in a neutral position; means to move the retaining means to ineffective position each machine operation; normally effective means to block movement of the retaining means to ineffective position; and means whereby the causing means moves the blocking means away from blocking position.

5. In a machine of the class described, the combination of a totalizer line; a balance totalizer on the line; an item totalizer on the line; a set of actuators for each of the totalizers; a traveling carriage; means operated by the traveling carriage in certain columnar positions to cause the totalizers to be engaged with and disengaged from their respective actuators in subtract time; means to move the actuators; means to control the differential movement of the actuators for the item totalizer so that they move an extent equal to the complement of an amount to cause the complement of said amount to be subtracted to obtain the effect of simultaneous subtraction and addition in the two totalizers; means to retain the actuators for the item totalizer in a neutral position; means to move the retaining means to ineffective position each machine operation; normally effective means to block movement of the retaining means to ineffective position; normally ineffective means to block movement of the retaining means to ineffective position; means whereby the traveling carriage and the means operated thereby move the first retaining means to ineffective position to permit movement of the actuators for the item totalizer in subtract operations; and means including a depressible key and parts associated therewith to move the second retaining means to effective position to retain the actuators for the item totalizer in neutral position irrespective of the position of the first retaining means.

6. In a calculating machine, the combination of a totalizer line; a balance totalizer on the line; an item totalizer on the line; manipulative means to control the balance totalizer for total operations; actuators for the item totalizers; means to retain the actuators in a neutral position; means to move the retaining means to ineffective position each machine operation; means normally effective to prevent movement of the retaining means to ineffective position; and means whereby the manipulative means moves the preventing means to ineffective position so that a total operation may be performed in both of the totalizers at the same time.

7. In a machine of the class described, adapted to operate through one cycle to perform adding, subtracting and total operations and through three cycles to perform overdraft operations, the combination of a totalizer line; a balance totalizer on the line; an item totalizer on the line; actuators for the item totalizer; means to retain the actuators in neutral position to prevent functioning of the item totalizer; means effective each cycle of machine operation to move the retaining means to ineffective position; and means effective during the first and second cycles of an overdraft operation to block movement of the retaining means to ineffective position to prevent functioning of the item totalizer during said first two cycles of an overdraft operation.

8. In a machine of the class described, the combination of a totalizer line; a balance totalizer on the line; an item totalizer on the line; actuators for the totalizers; means to control the engagement of the totalizer line to cause the totalizers to be engaged with and disengaged from the actuators in proper time to perform entry operations consisting of one-cycle operations and overdraft operations consisting of two transposing cycles and a final total-taking cycle; means to retain the actuators for the item totalizers in a neutral position to prevent functioning of said item totalizer; means to move the retaining means to ineffective position each cycle of operation; means to initiate an overdraft operation; means operated by the initiating means to obstruct movement of the retaining means to ineffective position during the two transposing cycles of an overdraft operation to prevent functioning of the item totalizer; and means to move the obstructing means to ineffective position prior to the total-taking cycle of an overdraft operation to simultaneously effect a total-taking operation in the balance and the item totalizers.

9. In a machine of the class described, the combination with a single support, a totalizer on the support, actuators for the totalizer, and means to condition certain elements of the machine for subtracting amounts from the totalizer, of a counting device on the support; actuators for the counting device; and automatic means rendered effective by said conditioning means when conditioning the machine for subtracting amounts from the totalizer to control the actuators for the counting device to cause the complement of an amount to be subtracted from the counting device to count the last named amount in said counting device.

10. In a machine of the class described, the combination with a supporting element, a totalizer on the supporting element, actuators to add or subtract in the totalizer, manipulative devices to control the extent of movement of the actuators, and subtract conditioning means, of a counting device on the supporting means; normally inactive actuators for the counting device; means to control the extent of movement of the last-named actuators to subtract the complement of an amount from the counting device when the first-named actuators subtract an amount from the totalizer; and means controlled by the manipulative devices and the subtract conditioning means to render the actuators for the counting device active.

11. In a machine of the class described, the combination with a totalizer, and actuators for the totalizer, of a counting device; normally inactive actuators for the counting device; conditioning means to condition certain elements of the machine to cause the respective actuators to subtract amounts from the totalizer and the counting device; manipulative devices; means settable by the manipulative devices to control the extent of movement of the actuators for the counting device to subtract the true complement of the amount set up on the manipulative devices from the counting device to thereby enter the amount set up on the manipulative devices into the counting device; and means controlled by the conditioning means to render the actuators for the counting device active.

12. In a calculating machine, the combination of a totalizer line; a set of elements on the line; another set of elements on the line; means to condition certain elements of the machine to cause the machine to operate in subtract timing for subtract operations; actuating means to subtract items from the first set of elements during subtract operations; normally ineffective means to cause the complement of 1 to be subtracted from said other set of elements to count 1 in said other set of elements during subtract operations; and means controlled by the first-named means to automatically render the causing means effective when an item is subtracted from the first-named set of elements.

13. In a machine of the class described, the combination of two totalizers; means to condition the totalizers for subtract operations; item entering means, including elements settable to the complement of an item to enter said item into one of the totalizers at the time an amount is subtracted from the other totalizer; normally inactive means to control the complemental movement of said elements to enter the item into said one totalizer by subtracting the complement of the item entered into said one totalizer; and connections controlled by the subtract conditioning means to render the normally inactive means active.

14. In a machine of the class described, constructed to perform positive total recording operations in single cycles of operation, and overdraft operations in a plurality of cycles of operation to convert the complement of an amount into a true negative amount and to record said true negative amount, the combination of a balance totalizer; an item counter; actuators for the item counter; actuators for the balance totalizer; recording means settable by the actuators; a retaining device to normally retain the item counter actuators against movement; means operable during said single cycles of operation to withdraw the retaining device to enable the actuators to set the recording means; means to block movement of the retaining device by its withdrawing means during each cycle of an overdraft operation except a predetermined cycle of said overdraft operation to prevent movement of the item counter actuators; and means to render the last-named means ineffective during said predetermined cycle to enable the item counter actuators to set the recording means to make a record of the data standing on the item counter simultaneously with the recording of said true negative amount during an overdraft operation.

15. In a machine of the class described, the combination with a balance totalizer, actuators for the balance totalizer, means to engage the totalizer and the actuators, and means to condition the engaging means for subtract timing, of an item counter; actuators for the item counter; a locking means to normally maintain the item counter actuators against movement; means to withdraw the locking means; and connections actuated by the subtract conditioning means to control the withdrawal of the locking means when the balance totalizer is conditioned for subtract operations by the subtract conditioning means, said locking means being effective to maintain the item counter actuators against movement when the balance totalizer is conditioned for adding operations.

16. In a calculating machine, the combination of a totalizer line; two totalizers on the line; actuators for one of the totalizers; manipulative devices to control the movement of said actuators; conditioning means to condition the totalizers for a subtract operation; actuators for the other one of said totalizers; means to normally arrest the last-named actuators in their zero positions; means to arrest the last-named actuators in the nine positions; and means rendered effective by the conditioning means and the manipulative devices to render the means to normally arrest the last-named actuators in zero position ineffective to thereby release the last-named actuators to move to the nine positions to automatically subtract the complement of "1" from said other totalizer, to obtain the effect of additively entering "1" in said other totalizer.

17. In a machine of the character described, the combination of a totalizer line having two sets of accumulator elements thereon; means to count items in one of said sets of elements by subtracting the complement of the number of items therefrom; means to normally disable the item counting means; a traveling carriage; means operated by the traveling carriage when moved to a certain columnar position to select both sets of elements for a subtract operation; amount keys to determine the amounts to be subtracted from the other set of elements; and means actuated by the last-named means and the amount keys to actuate the disabling means to enable the item counting means when the carriage is in said certain columnar position and an amount key is operated.

18. In a machine of the character described, the combination of a totalizer line having two sets of totalizer elements thereon; normally disabled means to count items in one of the sets of elements by subtracting the complement of the number of items therefrom; devices to control the extent of movement of the last-named means when enabled; a plurality of keys to set up amounts to be entered into the other set of elements; means operated by the depression of any one of the keys to enable the item counting means; means to retain the item counting means ineffective irrespective of the enabling means; a traveling carriage; and means whereby the traveling carriage in certain tabulated positions causes the retaining means to be moved into ineffective position.

19. In a machine of the class described, the combination of a totalizer line having two sets of totalizer elements thereon; normally ineffective means to count items in one of the sets of elements by subtracting the complement of the number of the items therefrom; means to control the extent of movement of said means when subtracting; means to select and condition both sets of elements for a subtract operation; keys to set up amounts to be subtracted from the other set of elements; and means operated by the selecting and conditioning means, and by the depression of any one of the keys, to render the item counting means effective.

20. In a machine of the class described, the combination of a totalizer line; a set of add-subtract totalizer elements on the line; means to select and condition the add-subtract totalizer elements for subtraction; actuators to enter amounts in the add-subtract totalizer elements; amount keys to control the extent of movement of the actuators; three denominational orders of item totalizer elements on said line; actuators for the item totalizer elements; means to arrest the item totalizer actuators after moving nine steps; a plurality of means to retain the item totalizer actuators in neutral positions; means controlled by said selecting and conditioning means when the add-subtract totalizer is selected and conditioned for a subtract operation to render one of said retaining means ineffective; and means actuated upon operation of an amount key to render the other retaining means ineffective, to release the item totalizer actuators to move under control of said arresting means to thereby subtract the complement of "1" from the item counting elements to accumulate "1" for each subtract operation performed in the add-subtract elements.

21. In a calculating machine, the combination of a totalizer line; a balance totalizer on the line; actuators for said balance totalizer; means to select and condition the balance totalizer for subtraction; another totalizer on the line having three denominational orders; an actuator for each order; a latch for each actuator to normally retain the actuators in neutral positions; another means to normally retain the actuators in neutral positions; keys to set up amounts to be subtracted from the balance totalizer; means rendered effective by the selecting and conditioning means to withdraw the said other retaining means; means actuated by the depression of an amount key to withdraw said latches to release the actuators; and means to arrest the actuators after moving nine steps to count "one" in the said other totalizer by subtracting the complement of "one" therefrom.

22. In a machine of the class described, the combination of a totalizer support; two totalizers on said support in axial alinement with each other; means to render both totalizers operable to simultaneously receive subtract entries; main and auxiliary actuators for one of the totalizers; a single latch to normally latch said actuators against movement; keys to control the extent of movement of actuators, said actuators so constructed that their coaction with the keys will cause the main actuators to be positioned an extent corresponding to the complement of the depressed keys; a plurality of additional latches to normally latch said actuators against movement; means operated by the keys to selectively operate the plurality of latches to release the actuators so that they can be controlled by the depressed keys to subtract the complement of the amount set up on the keys to thereby count said amount in said one totalizer; and means rendered effective by the rendering means to withdraw said single latch.

23. In a machine of the class described, the combination of a totalizer line; two totalizers on said line; a set of actuators for each totalizer; means to control the engagement of the totalizers and actuators for simultaneous subtract operations; auxiliary actuators associated with one set of actuators; a latch to normally latch said one set of actuators and their associated auxiliary actuators against movement; a plurality of rows of keys associated with the normaly latched actuators; means rendered effective by the controlling means to withdraw said latch to thereby unlatch the normally latched actuators; a plurality of other latches to normally maintain the actuators for said one totalizer in neutral position; and means operated by the keys of one order to control the latch for that order, and ne latches for higher orders, to release the actuators for said one totalizer, said actuators and their associated auxiliary actuators so constructed and controlled that coaction with the depressed keys will cause the actuators to be positioned an extent commensurate with the complement of the value set up by the depressed keys, to thereby count an amount in said one totalizer, while an amount is being subtracted from the other totalizer.

24. In a calculating machine, the combination of a totalizer having three denominational orders; keys to set up amounts to be entered into the totalizer; a main actuator for each denominational order controllable by said keys; means to control the engagement of the totalizer with the main actuators in subtract timing; means for moving said main actuator under control of the depressed keys during a machine operation; an auxiliary actuator for each of the two higher denominational orders normally disconnected from the main actuators and constructed to coact with the depressed keys when connected to the main actuators; normaly ineffective connecting means to connect the auxiliary actuators to associated main actuators; and means operated by the depression of keys in two adjacent orders to render the connecting means for the higher of the two adjacent orders effective to connect the auxiliary actuator to the main actuator, said auxiliary actuator being constructed to coact with the depressed keys to thereby modify the extent of movement of the main actuator to cause the true complement of the amount set up on the keys to be subtracted from the totalizer to additively enter said amount in said totalizer during a machine operation.

25. In a machine of the class described, the combination of a totalizer having several denominational orders; a row of keys for each order to control entry of amounts in the totalizer; means to control the engagement of the totalizer for a subtract operation; a main actuator for each denominational order normally controlled by said keys; an auxiliary actuator for each order above the lowest order; means for moving said actuators under control of said keys during a cycle of operation; means to connect the auxiliary actuators to their corresponding main actuator for unitary movement therewith; and means actuated by the keys when keys are depressed in more than one order to render the connecting means, in all orders in which keys are depressed above the lowest order in which a key is depressed, effective to modify the extent of movement of the main actuators under control of the keys to cause the true complement of the amount set up on the keys to be subtracted from the totalizer to additively enter said amount in said totalizer during a cycle of operation.

26. In a machine of the class described, the combination of a totalizer having several denominational orders; a row of keys for each order to control entry of amounts in the totalizer; means to control the engagement of the totalizer for subtract operations; a main actuator for each order, each of which is normally adapted to be positioned under control of the keys of its respective order to the complement of the value of the depressed key; an auxiliary actuator associated with each of the orders above the lowest order, each of which is adapted to be positioned under control of the keys of its respective order to one digit less than the complement of the value of the depresed key; means for moving said actuators under control of said keys during a cycle of operation; and means whereby depression of keys in more than one order causes the auxiliary actuator in all orders in which keys are depressed above the lowest order in which a key is depressed to be connected to its associated main actuator to modify the extent of movement of the main actuators under control of the keys to cause the true complement of the amount set up on the keys to be subtracted from the totalizer to additively enter said amount in said totalizer during a cycle of operation.

27. In a machine of the character described, the combination of a totalizer having several denominational orders; a row of keys for each order to control entry of amounts in the totalizer; means to control the engagement of the totalizer for a subtract operation; a main actuator for each order, each of which is adapted to be positioned under control of the keys of its respective order to the complement of the value of the depressed keys; an auxiliary actuator associated with each of the orders above the lowest order, each of which is adapted to be positioned under control of the keys of its respective order to one digit less than the complement of the value of the depressed key; means for moving said actuators under control of the keys during a cycle of operation; means to connect each auxiliary actuator to the main actuator for the corresponding order; means to normally retain the auxiliary actuators in a neutral position and to normally retain the connecting means in ineffective position; and means effective when keys are depressed in more than one order to move the retaining means, in all orders in which keys are depressed above the lowest order in which a key is depressed, to ineffective position to release the corresponding auxiliary actuator and to release the connecting means to connect the released auxiliary actuator for that order to its associated main actuator to modify the extent of movement of the main actuators under control of the keys to cause the true complement of the amount set up on the keys to be subtracted from the totalizer to additively enter said amount in said totalizer during a cycle of operation.

28. In a machine of the character described, the combination of a totalizer line having two sets of totalizer elements thereon; a keyboard for setting up amounts; means to condition certain elements of the machine for subtract operations in the two sets of totalizer elements; means settable under control of certain keys on the keyboard to determine the value of the amounts to be subtracted from one set of totalizer elements during a subtract operation; and means released by said conditioning means and settable under control of other keys on the keyboard to cause an amount equal to the true complement of the amounts set up on said other keys to be subtracted from the other set of totalizer elements concurrently with the subtract operation in the said one set of totalizer elements, to obtain the effect of adding said latter amount in said other set of totalizer elements while subtracting an amount in the said one set of totalizer elements.

JESSE R. GANGER.